(12) United States Patent
Sasai et al.

(10) Patent No.: US 11,729,389 B2
(45) Date of Patent: *Aug. 15, 2023

(54) IMAGE DECODING METHOD, IMAGE CODING METHOD, IMAGE DECODING APPARATUS, IMAGE CODING APPARATUS, PROGRAM, AND INTEGRATED CIRCUIT

(71) Applicant: Sun Patent Trust, New York, NY (US)

(72) Inventors: Hisao Sasai, Osaka (JP); Takahiro Nishi, Nara (JP); Youji Shibahara, Osaka (JP); Chong Soon Lim, Singapore (SG); Viktor Wahadaniah, Singapore (SG); Xuan Jing, Singapore (SG); Sue Mon Thet Naing, Singapore (SG)

(73) Assignee: SUN PATENT TRUST, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/690,271

(22) Filed: Mar. 9, 2022

(65) Prior Publication Data

US 2022/0201303 A1 Jun. 23, 2022

Related U.S. Application Data

(60) Continuation of application No. 16/801,228, filed on Feb. 26, 2020, now Pat. No. 11,310,500, which is a
(Continued)

(51) Int. Cl.
*H04N 19/124* (2014.01)
*H04N 19/147* (2014.01)
(Continued)

(52) U.S. Cl.
CPC ......... *H04N 19/124* (2014.11); *H04N 19/119* (2014.11); *H04N 19/12* (2014.11);
(Continued)

(58) Field of Classification Search
CPC .... H04N 19/124; H04N 19/119; H04N 19/12; H04N 19/147; H04N 19/176;
(Continued)

(56) References Cited

U.S. PATENT DOCUMENTS 5,122,875 A 6/1992 Raychaudhuri et al.
5,949,911 A 9/1999 Chui et al.
(Continued)

FOREIGN PATENT DOCUMENTS

CN 101019435 8/2007
CN 101411201 4/2009
(Continued)

OTHER PUBLICATIONS

International Search Report dated Dec. 13, 2011 in International (PCT) Application No. PCT/JP2011/005507.
(Continued)

*Primary Examiner* — Tat C Chio
(74) *Attorney, Agent, or Firm* — Wenderoth, Lind & Ponack, L.L.P.

(57) ABSTRACT

An image decoding method which can improve both image quality and coding efficiency is an image decoding method for decoding a coded stream which includes a plurality of processing units and a header for the processing units, the coded stream being generated by coding a moving picture, the processing units including at least one processing unit layered to be split into a plurality of smaller processing units, the image decoding method including specifying a hierarchical layer having a processing unit in which a parameter necessary for decoding is stored, by parsing hierarchy depth information stored in the header, and decoding the processing unit using the parameter stored in the processing unit located at the specified hierarchical layer.

4 Claims, 45 Drawing Sheets

Related U.S. Application Data continuation of application No. 16/019,705, filed on Jun. 27, 2018, now Pat. No. 10,616,579, which is a continuation of application No. 15/633,917, filed on Jun. 27, 2017, now Pat. No. 10,038,905, which is a division of application No. 15/246,960, filed on Aug. 25, 2016, now Pat. No. 9,743,087, which is a division of application No. 13/818,702, filed as application No. PCT/JP2011/005507 on Sep. 29, 2011, now Pat. No. 9,749,630.

(60) Provisional application No. 61/388,221, filed on Sep. 30, 2010.

(51) Int. Cl.
  *H04N 19/176* (2014.01)
  *H04N 19/70* (2014.01)
  *H04N 19/119* (2014.01)
  *H04N 19/46* (2014.01)
  *H04N 19/61* (2014.01)
  *H04N 19/12* (2014.01)
  *H04N 19/44* (2014.01)
  *H04N 19/42* (2014.01)

(52) U.S. Cl.
  CPC ......... *H04N 19/147* (2014.11); *H04N 19/176* (2014.11); *H04N 19/42* (2014.11); *H04N 19/44* (2014.11); *H04N 19/46* (2014.11); *H04N 19/61* (2014.11); *H04N 19/70* (2014.11)

(58) Field of Classification Search
  CPC ........ H04N 19/42; H04N 19/44; H04N 19/46; H04N 19/61; H04N 19/70; H04N 19/122; H04N 19/126; H04N 19/18; H04N 19/60
  See application file for complete search history.

(56) References Cited

U.S. PATENT DOCUMENTS

| | | |
|---|---|---|
| 6,041,143 A | 3/2000 | Chui et al. |
| 7,515,635 B2 | 4/2009 | Hagai et al. |
| 7,701,365 B2 | 4/2010 | Fukuhara et al. |
| 8,009,733 B2 | 8/2011 | Hagai et al. |
| 8,184,697 B2 | 5/2012 | Hagai et al. |
| 8,204,112 B2 | 6/2012 | Hagai et al. |
| 8,208,542 B2 | 6/2012 | Hagai et al. |
| 8,223,841 B2 | 7/2012 | Hagai et al. |
| 8,238,428 B2 | 8/2012 | Fuchs et al. |
| 8,320,693 B2 | 11/2012 | Fukuhara et al. |
| 8,406,299 B2 | 3/2013 | Karczewicz |
| 8,488,672 B2 | 7/2013 | Karczewicz |
| 8,937,998 B2 | 1/2015 | Karczewicz |
| 9,743,087 B2 | 8/2017 | Sasai |
| 9,936,216 B2 | 4/2018 | Min et al. |
| 10,616,579 B2 | 4/2020 | Sasai |
| 11,310,500 B2 * | 4/2022 | Sasai ............... H04N 19/70 |
| 2004/0057523 A1 | 3/2004 | Koto et al. |
| 2004/0146105 A1 | 7/2004 | Hagai et al. |
| 2005/0123056 A1 | 6/2005 | Wang et al. |
| 2006/0114989 A1 | 6/2006 | Panda |
| 2006/0159169 A1 | 7/2006 | Hui et al. |
| 2006/0209952 A1 | 9/2006 | Tanizawa et al. |
| 2006/0285591 A1 | 12/2006 | Hagai et al. |
| 2007/0086518 A1 | 4/2007 | Jeon et al. |
| 2007/0147493 A1 | 6/2007 | Jeon et al. |
| 2007/0206679 A1 | 9/2007 | Lim et al. |
| 2008/0069213 A1 | 3/2008 | Hagai et al. |
| 2008/0069214 A1 | 3/2008 | Hagai et al. |
| 2008/0069215 A1 | 3/2008 | Hagai et al. |
| 2008/0069216 A1 | 3/2008 | Hagai et al. |
| 2008/0260027 A1 | 10/2008 | Karczewicz |
| 2008/0260030 A1 | 10/2008 | Karczewicz |
| 2008/0260031 A1 | 10/2008 | Karczewicz |
| 2009/0041433 A1 | 2/2009 | Coles et al. |
| 2009/0076828 A1 | 3/2009 | Li |
| 2009/0080535 A1 | 3/2009 | Yin et al. |
| 2009/0102686 A1 | 4/2009 | Fukuhara et al. |
| 2009/0116558 A1 | 5/2009 | Chen et al. |
| 2009/0196517 A1 | 8/2009 | Divorra Escoda et al. |
| 2009/0274378 A1 | 11/2009 | Fukuhara et al. |
| 2009/0297053 A1 | 12/2009 | Nakamura |
| 2010/0014763 A1 | 1/2010 | Wittmann et al. |
| 2010/0061444 A1 | 3/2010 | Wilkins et al. |
| 2010/0074338 A1 | 3/2010 | Yamori et al. |
| 2010/0086028 A1 * | 4/2010 | Tanizawa ............ H04N 19/176 375/240.12 |
| 2010/0272174 A1 | 10/2010 | Toma et al. |
| 2011/0090967 A1 | 4/2011 | Chen et al. |
| 2011/0096835 A1 | 4/2011 | Lim et al. |
| 2011/0110429 A1 | 5/2011 | La et al. |
| 2011/0194613 A1 | 8/2011 | Chen et al. |
| 2011/0249743 A1 | 10/2011 | Zhao et al. |
| 2011/0293195 A1 | 12/2011 | Nakagami et al. |
| 2012/0051431 A1 | 3/2012 | Chien et al. |
| 2012/0106652 A1 | 5/2012 | Huang et al. |
| 2012/0250770 A1 | 10/2012 | Hagai et al. |
| 2012/0251015 A1 | 10/2012 | Lim et al. |
| 2012/0300835 A1 | 11/2012 | Karczewicz |
| 2012/0314027 A1 | 12/2012 | Tian et al. |
| 2013/0034157 A1 | 2/2013 | Helle et al. |
| 2013/0058410 A1 | 3/2013 | Yasugi et al. |
| 2013/0071039 A1 | 3/2013 | Sato |
| 2013/0243095 A1 | 9/2013 | Nakagami et al. |
| 2013/0301739 A1 | 11/2013 | Sato |
| 2014/0056356 A1 | 2/2014 | Yu et al. |
| 2014/0321536 A1 | 10/2014 | Sato |
| 2014/0321537 A1 | 10/2014 | Sato |
| 2014/0321538 A1 | 10/2014 | Sato |
| 2015/0181222 A1 | 6/2015 | Nakagami et al. |
| 2016/0007028 A1 | 1/2016 | Yamori et al. |
| 2016/0007029 A1 | 1/2016 | Yamori et al. |
| 2016/0007030 A1 | 1/2016 | Yamori et al. |
| 2016/0007031 A1 | 1/2016 | Yamori et al. |
| 2016/0165255 A1 | 6/2016 | Yasugi et al. |
| 2016/0309197 A1 | 10/2016 | Helle et al. |
| 2016/0309198 A1 | 10/2016 | Helle et al. |
| 2016/0309199 A1 | 10/2016 | Helle et al. |
| 2016/0309200 A1 | 10/2016 | Helle et al. |
| 2016/0316229 A1 | 10/2016 | Helle et al. |
| 2016/0373737 A1 | 12/2016 | Nakagami et al. |
| 2018/0007370 A1 | 1/2018 | Sato |
| 2018/0007391 A1 | 1/2018 | Helle et al. |
| 2018/0109788 A1 | 4/2018 | Nakagami et al. |
| 2018/0220164 A1 | 8/2018 | Helle et al. |
| 2018/0234705 A1 | 8/2018 | Helle et al. |
| 2018/0310030 A1 | 10/2018 | Helle et al. |
| 2018/0324466 A1 | 11/2018 | Helle et al. |
| 2019/0104318 A1 | 4/2019 | Sato |
| 2019/0158887 A1 | 5/2019 | Helle et al. |
| 2019/0174148 A1 | 6/2019 | Helle et al. |
| 2019/0238874 A1 | 8/2019 | Yasugi et al. |
| 2019/0238896 A1 | 8/2019 | Helle et al. |
| 2019/0268592 A1 | 8/2019 | Nakagami et al. |
| 2020/0021857 A1 | 1/2020 | Helle et al. |
| 2020/0128277 A1 | 4/2020 | Helle et al. |
| 2020/0162764 A1 | 5/2020 | Helle et al. |
| 2020/0195978 A1 | 6/2020 | Helle et al. |
| 2020/0344495 A1 | 10/2020 | Helle et al. |
| 2021/0037265 A1 | 2/2021 | Helle et al. |
| 2021/0144367 A1 | 5/2021 | Nakagami et al. |

FOREIGN PATENT DOCUMENTS

| | | |
|---|---|---|
| CN | 101861735 | 10/2010 |
| EP | 2 051 529 | 4/2009 |
| JP | 2004-007563 | 1/2004 |
| JP | 2006-262004 | 9/2006 |
| JP | 2008-522500 | 6/2008 |
| JP | 2008-206211 | 9/2008 |
| JP | 2010-525677 | 7/2010 |
| JP | 2013-009165 | 1/2013 |
| JP | 2013-524669 | 6/2013 |

(56) References Cited

FOREIGN PATENT DOCUMENTS

| | | |
|---|---|---|
| JP | 2013-524708 | 6/2013 |
| RU | 2 128 405 | 3/1999 |
| RU | 2 340 114 | 11/2008 |
| WO | 92/16071 | 9/1992 |
| WO | 2008/126135 | 10/2008 |
| WO | 2008/132890 | 11/2008 |
| WO | 2009/151232 | 12/2009 |
| WO | 2009/158113 | 12/2009 |
| WO | 2010/070818 | 6/2010 |
| WO | 2010/095557 | 8/2010 |
| WO | 2011/140211 | 11/2011 |
| WO | 2011/142279 | 11/2011 |
| WO | 2011/152518 | 12/2011 |

OTHER PUBLICATIONS

"Test Model under Consideration", Joint Collaborative Team on Video Coding (JCT-VC) of ITU-T SG16 WP3 and ISO/IEC JTC1/SC29/WG11, JCTVC-A205 (draft007), 1st Meeting: Dresden, DE, Apr. 15-23, 2010 (Date Saved: Jul. 2010).

"Test Model under Consideration", Joint Collaborative Team on Video Coding (JCT-VC) of ITU-T SG16 WP3 and ISO/IEC JTC1/SC29/WG11, JCTVC-B205, 2nd Meeting: Geneva, CH, Jul. 21-28, 2010.

International Search Report dated Dec. 13, 2011 in International (PCT) Application No. PCT/JP2011/005495.

International Search Report dated Dec. 13, 2011 in International (PCT) Application No. PCT/JP2011/005520.

Extended European Search Report dated Dec. 11, 2014 in European Application No. 11828456.1.

Tzu-Der Chuang et al., "AhG Quantization: Sub-LCU Delta QP", Joint Collaborative Team on Video Coding (JCT-VC) of ITU-T SG16 WP3 and ISO/IEC JTC1/SC29/WG11, JCTVC-E051, 5th Meeting: Geneva, CH, Mar. 16-23, 2011.

Extended European Search Report dated Oct. 21, 2016 in European Patent Application No. 16188259.2.

Integrated Multimedia Selection Manual MPEG, Ohmsha, the Institute of Image Information and Television Engineers, May 30, 1997, pp. 83-85, with English translation.

Office Action dated Jan. 30, 2015 in U.S. Appl. No. 13/818,702.

Office Action dated Nov. 4, 2016 in U.S. Appl. No. 15/246,960.

Office Action and Search Report dated Jul. 21, 2017 in Taiwanese Patent Application No. 105141247, with English translation of Search Report.

Office Action dated Jul. 6, 2018 in Indian Patent Application No. 1363/CHENP/2013, with English-language translation.

Kemal Ugur et al., "Appendix to Description of video coding technology proposal by Tandberg Nokia Ericsson", Joint Collaborative Team on Video Coding (JCT-VC) of ITU-T SG16 WP3 and ISO/IEC JTC1/SC29/WG11, 1st Meeting: Dresden, DE, Apr. 15-23, 2010 JCTVC-A119_Appendix_Decoder_Description.

Office Action dated Sep. 10, 2018 issued for U.S. Appl. No. 15/591,493.

Definition for processor, IEEE 100, "The Authoritative Dictionary of IEEE Standards Terms", Seventh Edition, Dec. 2000.

Definition of decoder and parse, Microsoft Computer Dictionary, 2002.

Office Action dated Sep. 12, 2018 issued for U.S. Appl. No. 15/591,308.

Office Action dated Dec. 19, 2018 in European Patent Application No. 16188259.2.

H. 26L Test Model Long Term No. 5 (TML-5) draft0, Oct. 25, 2000, ITU.

Office Action dated Feb. 19, 2019 in U.S. Appl. No. 15/591,493.

Office Action dated Aug. 8, 2019 issued for U.S. Appl. No. 15/591,493.

Office Action dated Jan. 17, 2020 in U.S. Appl. No. 15/591,493.

Office Action dated Jul. 6, 2020 in U.S. Appl. No. 15/591,493.

Series H: Audio and Multimedia Systems Infrastructure of audiovisual services—Coding of moving video, Recommendation ITU-T H.264 Advanced video coding for generic audiovisual services, Jun. 3, 2010, H.264 (Mar. 2010), pp. 105-107.

Advanced video coding for generic audiovisual services, ITU-T Recommendation H.264, ITU-T, H.264 (Mar. 2005), pp. 50-53, 85-95.

Summons to attend oral proceedings dated Sep. 24, 2020 in European Patent Application No. 16188259.2.

Office Action dated Dec. 7, 2020 issued for U.S. Appl. No. 15/591,493.

Office Action dated Mar. 9, 2021 in Indian Application No. 201848049681.

Extended European Search Report issued for European Patent Application No. 21192324.8 dated Dec. 23, 2021.

* cited by examiner

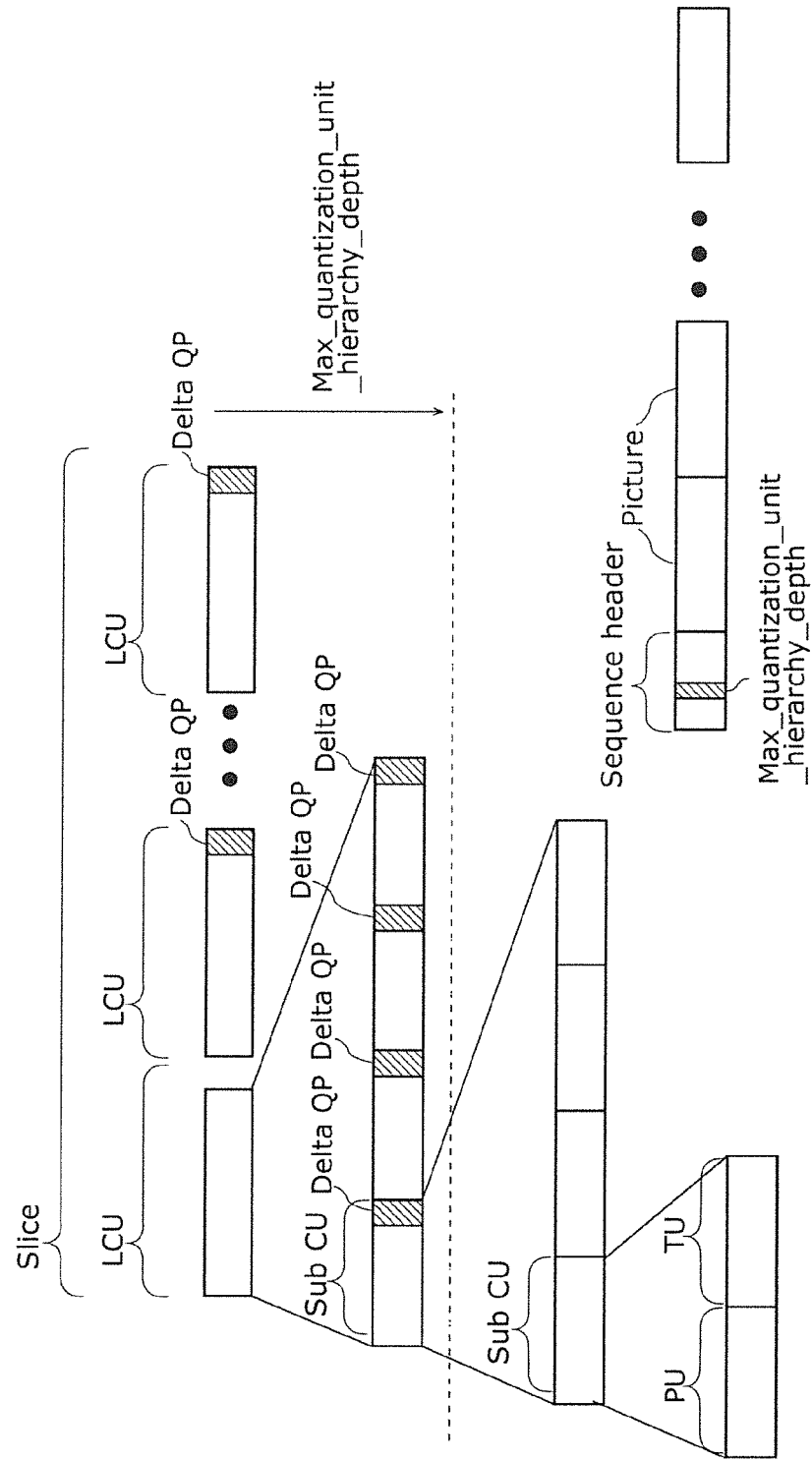

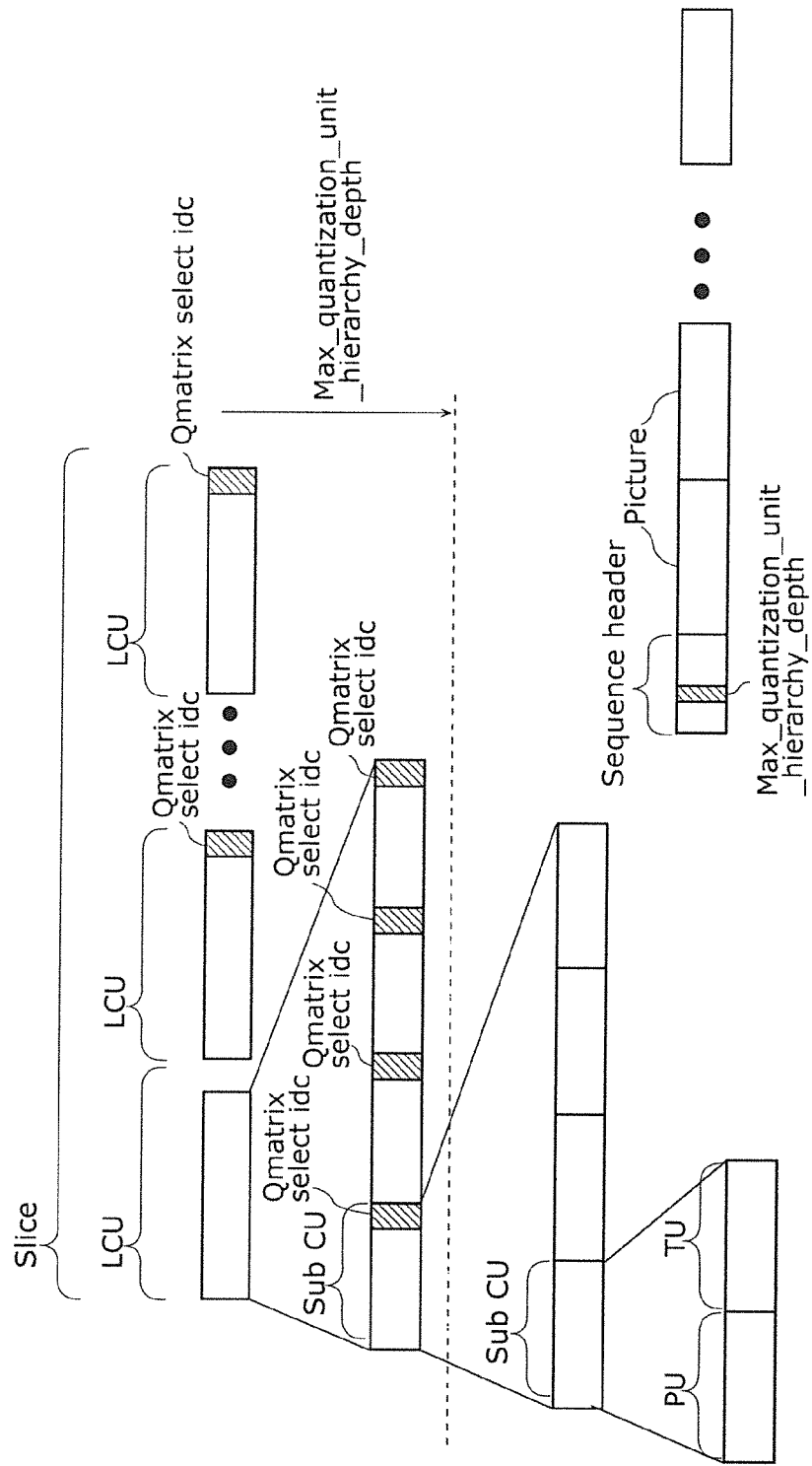

FIG. 18A

Sequence header

```
seq_parameter_set_rbsp( ) {
    profile_idc
    reserved_zero_8bits /* equal to 0 */
    level_idc
     seq_parameter_set_id
     bit_depth_luma_minus8
     bit_depth_chroma_minus8
     increased_bit_depth_luma
     line_bit_depth_chroma
     log2_max_frame_num_minus4
     log2_max_pic_order_cnt_lsb_minus4
     max_num_ref_frames
     gaps_in_frame_num_value_allowed_flag
     log2_min_coding_unit_size_minus3
     max_coding_unit_hierarchy_depth
     log2_min_transform_unit_size_minus2
     max_transform_unit_hierarchy_depth
     pic_width_in_luma_samples
     pic_height_in_luma_samples
     numExtraFilters
     for(i=0; i< numExtraFilters; i++){
     log2_filterCoeffPrecision
       halfNumTap
       for(j=0;j<(3*halfNumTap);j++){
       filterCoef[i][j]
       }
     }
     rbsp_trailing_bits( )
}
```

FIG. 18C

Slice header

```
slice_header( ) {
   first_lctb_in_slice
   slice_type
   pic_parameter_set_id
   frame_num
   if( IdrPicFlag )
      idr_pic_id
   pic_order_cnt_lsb
   if( slice_type = = P || slice_type = =B ) {
      num_ref_idx_active_override_flag                          d2
         if( num_ref_idx_active_override_flag ) {
            num_ref_idx_l0_active_minus1
            if( slice_type = =B )
               num_ref_idx_l1_active_minus1
         }
   }
   if( nal_ref_idc != 0 )
       dec_ref_pic_marking( )
   if(entropy_coding_mode_flag && slice_type != I )    d3
      cabac_init_idc
      slice_qp_delta
      alf_param()
      if( slice_type = = P || slice_type = = B ) {
        mc_interpolation_idc
         mv_competition_flag
         if ( mv_competition_flag ) {
          mv_competition_temporal_flag
         }
      }
      if ( slice_type = = B && mv_competition_flag)
         collocated_from_l0_flag sifo_param ()
      if (entropy_coding_mode_flag == 3)
          parallel_v2v_header( )
      edge_based_prediction_flag
      if( edge_prediction_ipd_flag = = 1 )
          threshold_edge
}
```

FIG. 19B

```
prediction_unit( x0, y0, currPredUnitSize ) {
    if( slice_type != I ) {
        skip_flag
        if( skip_flag ) {
            if( mv_competition_flag ) {
                if( inter_pred_idc != Pred_L1 && NumMVPCand(L0) > 1 )
                    mvp_idx_l0
                if( inter_pred_idc !=Pred_L0 && NumMVPCand(L1) > 1 )
                    mvp_idx_l1
            }
        } else {
            if(!entropy_coding_mode_flag)
                mode_table_idx
            else {
                if(slice_type != I )
                    pred_mode
                if( PredMode == MODE_INTRA ) {
                    planar_flag
                    if(planar_flag) {
                        planar_delta_y = getPlanarDelta()
                        planar_delta_uv_present_flag
                        if(planar_delta_uv_present_flag) {
                            planar_delta_u = getPlanarDelta()
                            planar_delta_v = getPlanarDelta()
                        }
                    } else {
                        if(!entropy_coding_mode_flag)
                            intra_split_flag
                        combined_intra_pred_flag
                        for( i = 0; i < ( intra_split_flag ? 4 : 1 ); i++) {
                            prev_intra_luma_pred_flag
                            if( !prev_intra_luma_pred_flag )
                                rem_intra_luma_pred_mode
                        }
                    }
                    if( chroma_format_idc != 0 )
                        intra_chroma_pred_mode
                }
            }
        }
    } else if( PredMode == MODE_INTER ) {
        if( entropy_coding_mode_flag)
            inter_partitioning_idc
        for( i = 0; i < NumPuParts( inter_partitioning_idc ); i++ ) {
            if( NumMergeCandidates > 0 ) {
                merge_flag[i]
                if(merge_flag[i] && NumMergeCandidates > 1 )
                    merge_left_flag[i]
            }
            if( !merge_flag[i] ) {
                if( slice_type == B )
                    inter_pred_idc[i]
                if( inter_pred_idc[i] != Pred_L1 ) {
                    if( entropy_coding_mode_flag )
                        if( num_ref_idx_l0_active_minus1 > 0 )
                            ref_idx_l0[i]           ← d6
                        mvres_l0[i]                 ← d7
                    else {
                        ref_idx_mvres_l0[i]
                    }
                    mvd_l0[i][0]
                    mvd_l0[i][1]
                    if( mv_competition_flag && NumMVPCand(L0, i) > 1 )
                        mvp_idx_l0[i]
                }
                if( inter_pred_idc[i] != Pred_L0 ) {
                    if( entropy_coding_mode_flag )
                        if( num_ref_idx_l1_active_minus1 > 0 )
                            ref_idx_l1[i]           ← d8
                        mvres_l1[i]                 ← d9
                    else {
                        ref_idx_mvres_l1[i]
                    }
                    mvd_l1[i][0]
                    mvd_l1[i][1]
                    if( mv_competition_flag && NumMVPCand(L1, i) > 1 )
                        mvp_idx_l1[i]
                }
            }
        }
    } else if( PredMode == MODE_DIRECT ) {
        if( slice_type == B )
            inter_pred_idc
        if( mv_competition_flag) {
            if( inter_pred_idc != Pred_L1 && NumMVPCand(L0) > 1 )
                mvp_idx_l0
            if( inter_pred_idc != Pred_L0 && NumMVPCand(L1) > 1 )
                mvp_idx_l1
        }
    }
}
```
PU

```
transform_unit( x0, y0, currTransformUnitSize ) {
    if( currTransformUnitSize >  MinTransformUnitSize &&
        currTransformUnitSize <= MaxTransformUnitSize)
    split_transform_unit_flag
    if( split_transform_unit_flag ) {
        splitTransformUnitSize = currTransformUnitSize >> 1
        x1 = x0 + splitTransformUnitS ize
        y1 = y0 + splitTransformUnitSize
        if(!entropy_coding_mode_flag)
          getVLCCBP( )
        transform_unit(x0, y0, split TransformUnitSize)
        if( x1 < PicWidthInSamples_L )
            transform_unit( x1, y0, split TransformUnitSize)
        if( y1 < PicHeightInSamplesL )
            transform_unit( x0, y1, split TransformUnitSize)
        if( x1 < PicWidthInSamplesL && y1 < PicHeightInSamplesL )
            transform_unit( x1, y1, split TransformUnitSize)
    }else {
        if( entropy_coding_mode_flag)
          coded_block_flag
        if( coded_block_flag ) {
          rotational_transform_idx
            if(!entropy_coding_mode_flag)
                residual_block_vlc( )                                    ——d10
            else
                residual_block_v2v( )
        }
    }
}
```

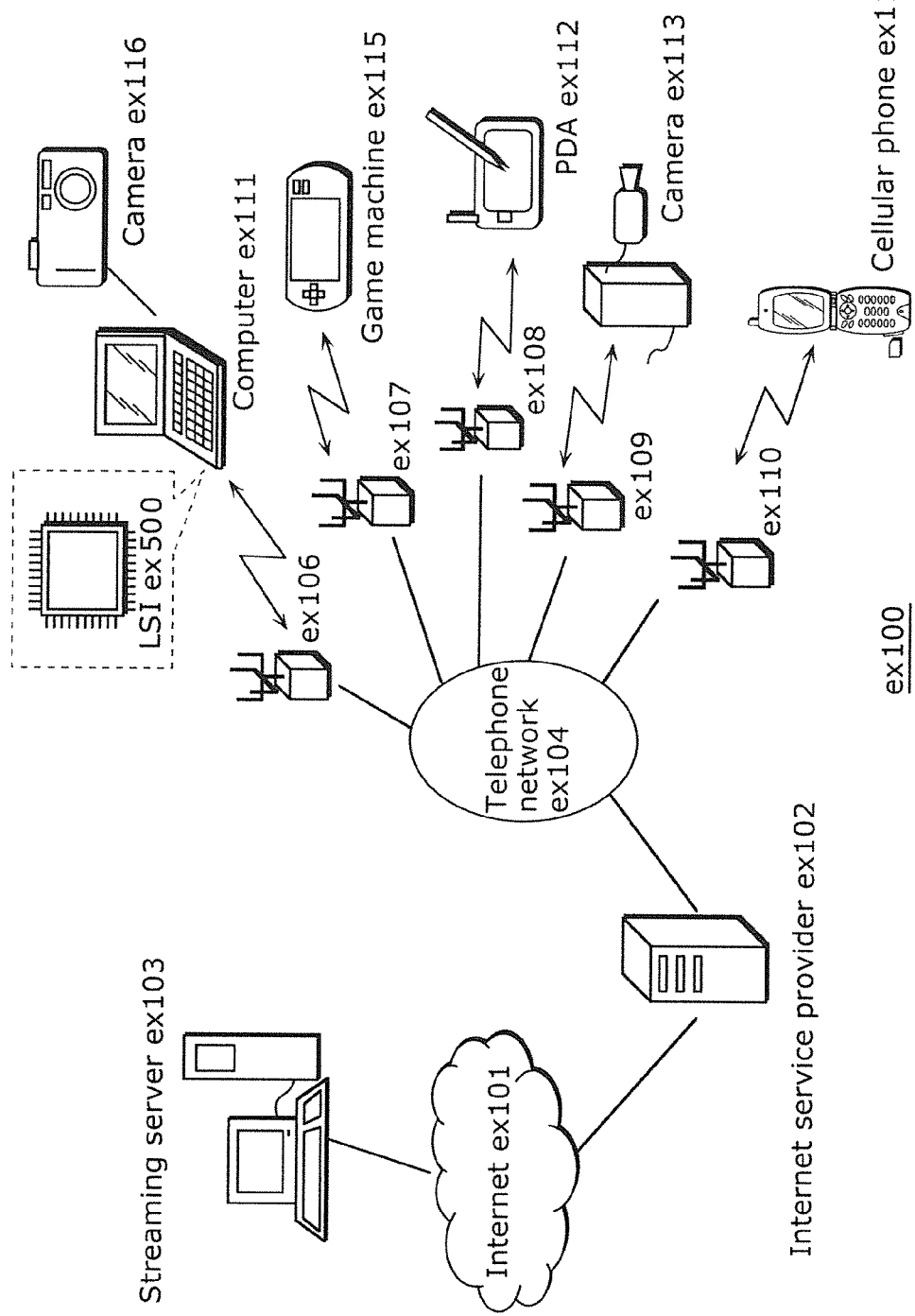

FIG. 26

| Video stream (PID=0x1011, Primary video) |
|---|
| Audio stream (PID=0x1100) |
| Audio stream (PID=0x1101) |
| Presentation graphics stream (PID=0x1200) |
| Presentation graphics stream (PID=0x1201) |
| Interactive graphics stream (PID=0x1400) |
| Video stream (PID=0x1B00, Secondary video) |
| Video stream (PID=0x1B01, Secondary video) |

FIG. 37
| Corresponding standard | Driving frequency |
|---|---|
| MPEG-4 AVC | 500 MHz |
| MPEG-2 | 350 MHz |
| ⋮ | ⋮ |
FIG. 38A
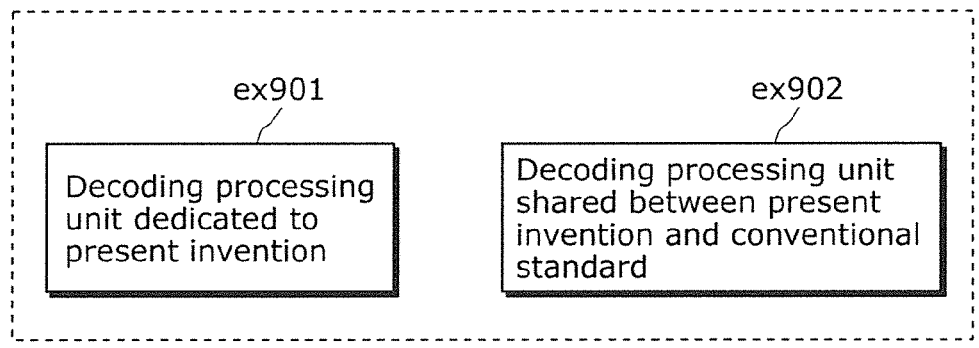
ex900
FIG. 38B
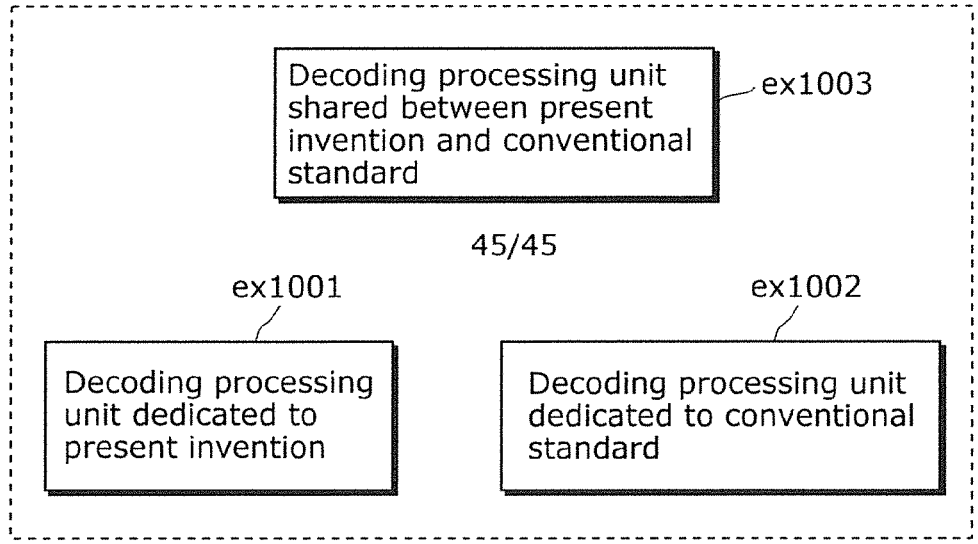
ex1000

IMAGE DECODING METHOD, IMAGE CODING METHOD, IMAGE DECODING APPARATUS, IMAGE CODING APPARATUS, PROGRAM, AND INTEGRATED CIRCUIT

TECHNICAL FIELD

The present invention relates to an image coding method for coding images or moving pictures included in multimedia data and an image decoding method for decoding coded images or moving pictures.

BACKGROUND ART

In video compressions standards like MPEG-1, MPEG-2, MPEG-4, or MPEG-4 AVC, a compressed picture is usually divided into rectangle units called "macroblocks". A macroblock is usually defined as a two-dimensional block of image samples. The image samples have a width of 16 pixels and a height of 16 pixels for luminance samples. The compression ratio for the macroblock is controlled by a quantization scale parameter for each macroblock. The quantization scale parameter determines the level of quantization to be applied to all the frequency coefficients. The quantization scale parameter is usually coded as a difference value from the quantization scale parameter of the previous macroblock in cording order, and is stored in a compressed macroblock header.

In new video standards under development, for example, the High Efficiency Video Coding (HEVC) standard by the MPEG standardization bodies, it is suggested that dividing the picture into large units can improve the coding efficiency of the compressed video (for example, refer to Non Patent Literature 1). In other words, a picture can be divided into coding units (CU) where each coding unit has a size that can be much larger than a macroblock. For example, the coding unit size can be 128 pixels by 128 pixels for luminance samples, which is approximately 64 times larger than a macroblock.

A large coding unit can be sub-divided into smaller units (sub coding units) to achieve better coding efficiency. Each coding unit or sub coding unit has three main components. The main components are a coding unit header, a prediction unit (PU), and a transform unit (TU).

FIG. 1 is a diagram showing the structure of compressed picture having coding units.

As shown in FIG. 1, a picture D100 includes a header (hereinafter referred to as picture header) and a body. The picture header includes parameters related to the picture (picture parameters) while the body includes compressed samples of a picture. Moreover, the body includes coding units such as coding units D102 and D104, and some of the coding units are divided into sub coding units. For example, the coding unit D102 is divided into sub coding units D106, and one of the sub coding units 106 is further divided into smaller sub coding units D108. The coding unit D104 or sub coding unit D108 has three main components. More specifically, the coding unit D104 includes a coding unit header D116, a prediction unit D118, and a transform unit D120 as the three main components. The sub coding unit D108 has a sub coding unit header D110, a prediction unit D112, and a transform unit D114 as the three main components. As shown in FIG. 1, a transform unit D120 is divided into small sub transform units D122, and one of the sub transform units D122 is divided into smaller sub transform units D124. The smallest transform units (sub transform units) D114 and D124 includes the quantized coefficients of a block, which requires a quantization scale parameter for the inverse quantization process of the coefficients.

CITATION LIST

Non Patent Literature

[NPL 1]
"Test Model under Consideration" Joint Collaborative Team on Video Coding (JCT-VC) of ITU-T SG16 WP3 and ISO/IEC JTC1/SC29/WG11, 2nd Meeting: Geneva, CH, 21-28 Jul., 2010, Document: JCTVC-B205

SUMMARY OF INVENTION

Technical Problem

However, in the image decoding method and the image coding method according to the above described Non Patent Literature 1, there is a problem that image quality and coding efficiency cannot be improved simultaneously. In other words, a parameter such as a quantization scale parameter necessary for coding and a coding process is stored in a picture header such that the parameter is applied to the whole body of the picture D100. As a result, it is impossible for image quality to be adjusted for each of the small processing units such as the sub coding unit, the prediction unit, the sub prediction unit, the transform unit, or the sub transform unit. Moreover, the amount of coding is large when a parameter is stored for each of the processing units such that the parameter is applied to each of the smallest processing units.

Therefore, the present invention is conceived in view of the problem, and an object of the present invention is to provide an image decoding method and an image coding method for simultaneously improving image and coding efficiency.

Solution to Problem

In order to attain the above described goal, an image decoding method according to an aspect of the present invention is an image decoding method for decoding a coded stream which includes a plurality of processing units and a header for the processing units, the coded stream being generated by coding a moving picture, the processing units including at least one processing unit layered to be split into a plurality of smaller processing units, the image decoding method including: specifying a hierarchical layer having a processing unit in which a parameter necessary for decoding is stored, by parsing hierarchy depth information stored in the header; and decoding the processing unit using the parameter stored in the processing unit located at the specified hierarchical layer.

With this, the processing unit is hierarchically layered. When a parameter is stored in each small processing unit located at a lower hierarchical layer, the small processing units can be decoded by applying a different parameter to each of the small processing units. As a result, image quality can be improved. Moreover, since the hierarchical layer having a processing unit in which a parameter necessary for decoding are stored is specified by parsing hierarchy depth information, it is possible for the hierarchical layer to be set at an arbitrary hierarchical layer instead of being limited to the lowest hierarchical layer. Therefore, the amount of coding for all parameters included in a coded stream can be reduced compared with the case where a parameter is stored for each of the smallest processing units located at the lowest hierarchical layer, and coding efficiency can be improved. With this, image quality and coding efficiency can be improved simultaneously. Moreover, since by parsing the hierarchy depth information, a hierarchical layer having a processing unit in which a parameter is stored is specified, it is possible to reduce the burden of a process of searching the processing unit in which the parameter is stored.

Moreover, the coded stream is generated by coding which includes orthogonal transform and quantization, the processing unit is layered to be smaller in a direction from a higher level to a lower level, a coding unit exists as a largest processing unit at a highest hierarchical layer, and a transform unit exists as a processing unit smaller than the coding unit at a lower hierarchical layer that is deeper than the highest hierarchical layer, the parameter is a quantization parameter applied to the transform unit, the hierarchy depth information indicates a lower hierarchical layer that is deeper than the highest hierarchical layer, and (i) a hierarchical layer indicated by the hierarchy depth information or (ii) a hierarchical layer which is higher than the hierarchical layer and is other than the highest hierarchical layer is specified, when specifying a hierarchical layer having a processing unit in which the quantization parameter is stored.

With this, it is possible for image quality in quantization by a quantization parameter and coding efficiency in the quantization parameter to be improved simultaneously.

Moreover, the header may be a picture header for a picture including the processing units, and the hierarchy depth information may be stored in the picture header.

With this, a hierarchy having a processing unit in which a parameter necessary for decoding is stored can be identified as a common hierarchical layer for the whole picture.

Moreover, when the processing unit is decoded, the quantization parameter located, within the processing unit, after a transform coefficient generated by the orthogonal transform and quantization may be used.

With this, since the quantization parameter is stored only when there are transform coefficients, the quantization parameter is not stored when there are no transform coefficients and coding efficiency can be improved.

Moreover, in order to achieve the above mentioned goal, an image coding method according to an aspect of the present invention is an image coding method for generating, by coding a moving picture, a coded stream which includes a plurality of processing units and a header for the processing units, the processing units including at least one processing unit layered to be split into a plurality of smaller processing units, the image coding method including: coding the moving picture; writing, into the header, hierarchy depth information for specifying a hierarchical layer having a processing unit in which a parameter necessary for decoding is stored; and writing the parameter into the processing unit located at the hierarchical layer specified by the hierarchy depth information.

With this, when the processing unit is hierarchically layered, a parameter can be written which is different for each of the small processing units that are located at the low hierarchical layers. As a result, the image decoding apparatus can decode the processing units by applying a different parameter to each of the small processing units, and therefore image quality can be improved. Moreover, by writing, into a header, the hierarchy depth information for specifying the hierarchical layer having a processing unit in which a parameter necessary for decoding is stored, the hierarchical layer can be notified to the image decoding apparatus.

Therefore, an arbitrary hierarchical layer can be set without limiting the hierarchical layer to the lowest hierarchical layer. Therefore, the amount of coding for all parameters included in a coded stream can be reduced compared with the case where a parameter is stored for each of the smallest processing unit located at the lowest hierarchical layer, and coding efficiency can be improved. With this, image quality and coding efficiency can be improved simultaneously.

Moreover, orthogonal transform and quantization are performed on the moving picture when the moving picture is coded, the processing unit is layered to be smaller in a direction from a higher level to a lower level, a coding unit exists as a largest processing unit at a highest hierarchical layer, and a transform unit exists as a processing unit smaller than the coding unit at a lower hierarchical layer that is deeper than the highest hierarchical layer, the parameter is a quantization parameter applied to the transform unit, the hierarchy depth information indicates a hierarchical layer that is lower than the highest hierarchical layer, and the parameter is written into a processing unit at (i) a hierarchical layer indicated by the hierarchy depth information or (ii) a hierarchical layer which is higher than the hierarchical layer and is other than the highest hierarchical layer, when the quantization parameter is written.

With this, it is possible for image quality in quantization by a quantization parameter and coding efficiency in the quantization parameter to be improved simultaneously.

Moreover, the header is a picture header for a picture including the processing units, and the hierarchy depth information may be written into the picture header when the hierarchy depth information is written.

With this, a hierarchical layer having a processing unit in which a parameter necessary for decoding is stored can be commonly set for the whole picture.

Moreover, when the quantization parameter is written, the quantization parameter may be written within the processing unit, after a transform coefficient generated by the orthogonal transform and quantization.

With this, it is possible for a quantization parameter to be written only when there are transform coefficients, and coding efficiency can be improved.

It should be noted that the present invention can be implemented as the above described image decoding method and image coding method. It can also be implemented as an apparatus for coding or decoding an image, an integrated circuit, a program for decoding or coding an image according to the methods, and a recording medium having the program stored thereon.

Advantageous Effects of Invention

The image decoding method and the image coding method according to the present invention can improve image quality and coding efficiency simultaneously.

BRIEF DESCRIPTION OF DRAWINGS

FIG. 6A is a diagram showing the configuration of a coded stream according to Embodiment 1 of the present invention.

FIG. 6B is a diagram showing the configuration of a coded stream according to Embodiment 1 of the present invention.

FIG. 18A is a diagram showing a syntax of sequence header according to Embodiment 1 of the present invention.

FIG. 18C is a diagram showing a syntax of slice header according to Embodiment 1 of the present invention.

FIG. 19B is a diagram showing a syntax of prediction unit (PU) according to Embodiment 1 of the present invention.

FIG. 19C is a diagram showing a syntax of transform unit (TU) according to Embodiment 1 of the present invention.

FIG. 20 is an overall configuration of a content providing system for implementing content distribution services.

FIG. 26 illustrates a structure of multiplexed data.

FIG. 37 shows an example of a look-up table in which video data standards are associated with driving frequencies.

FIG. 38A is a diagram showing an example of a configuration for sharing a module of a signal processing unit.

FIG. 38B is a diagram showing another example of a configuration for sharing a module of the signal processing unit.

DESCRIPTION OF EMBODIMENTS

Hereafter, the embodiments of the present invention will be described with reference to the drawings.

Embodiment 1

Figure 1:
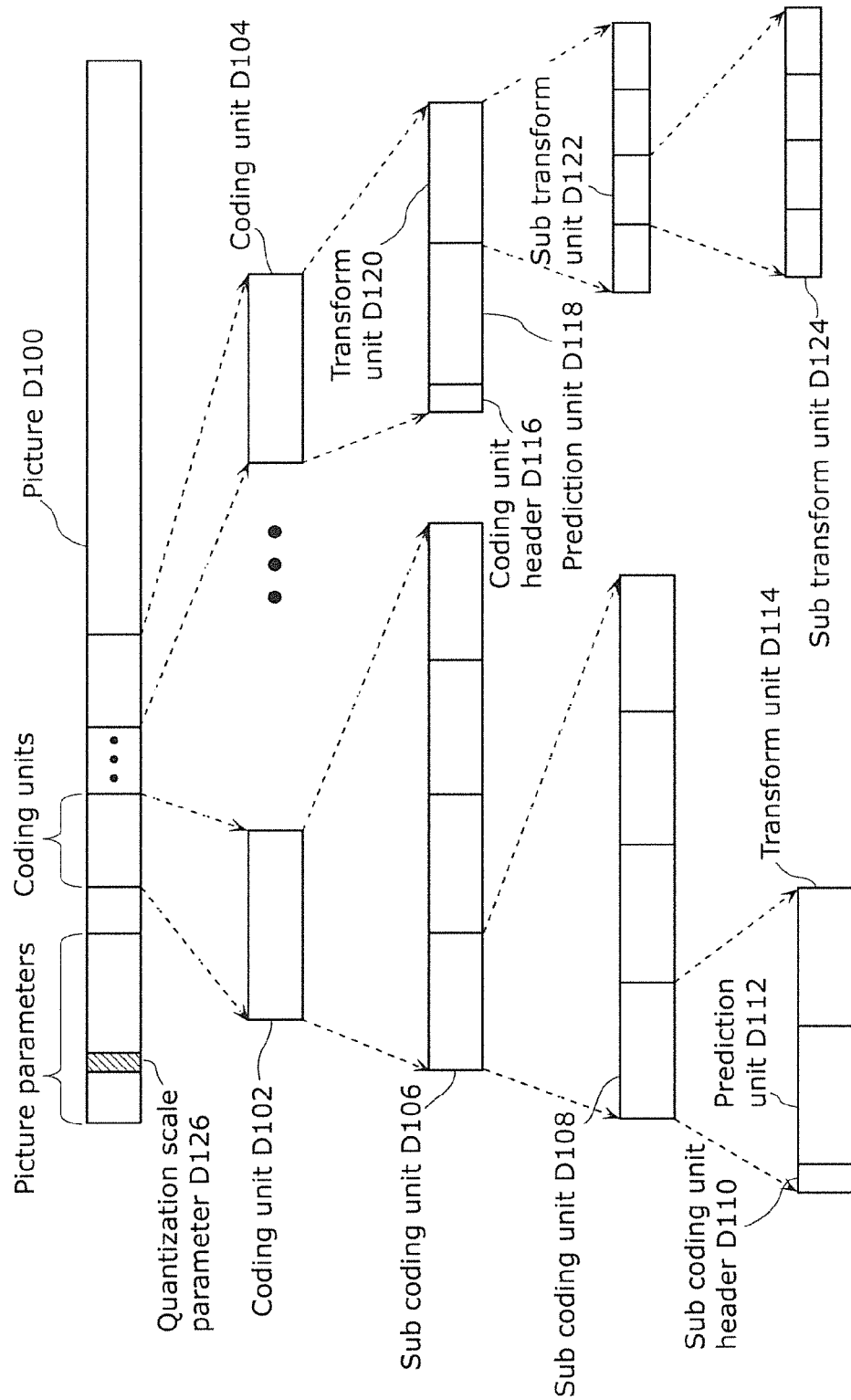
FIG. 1 is a diagram showing the configuration of a conventional coded stream.
Figure 2:
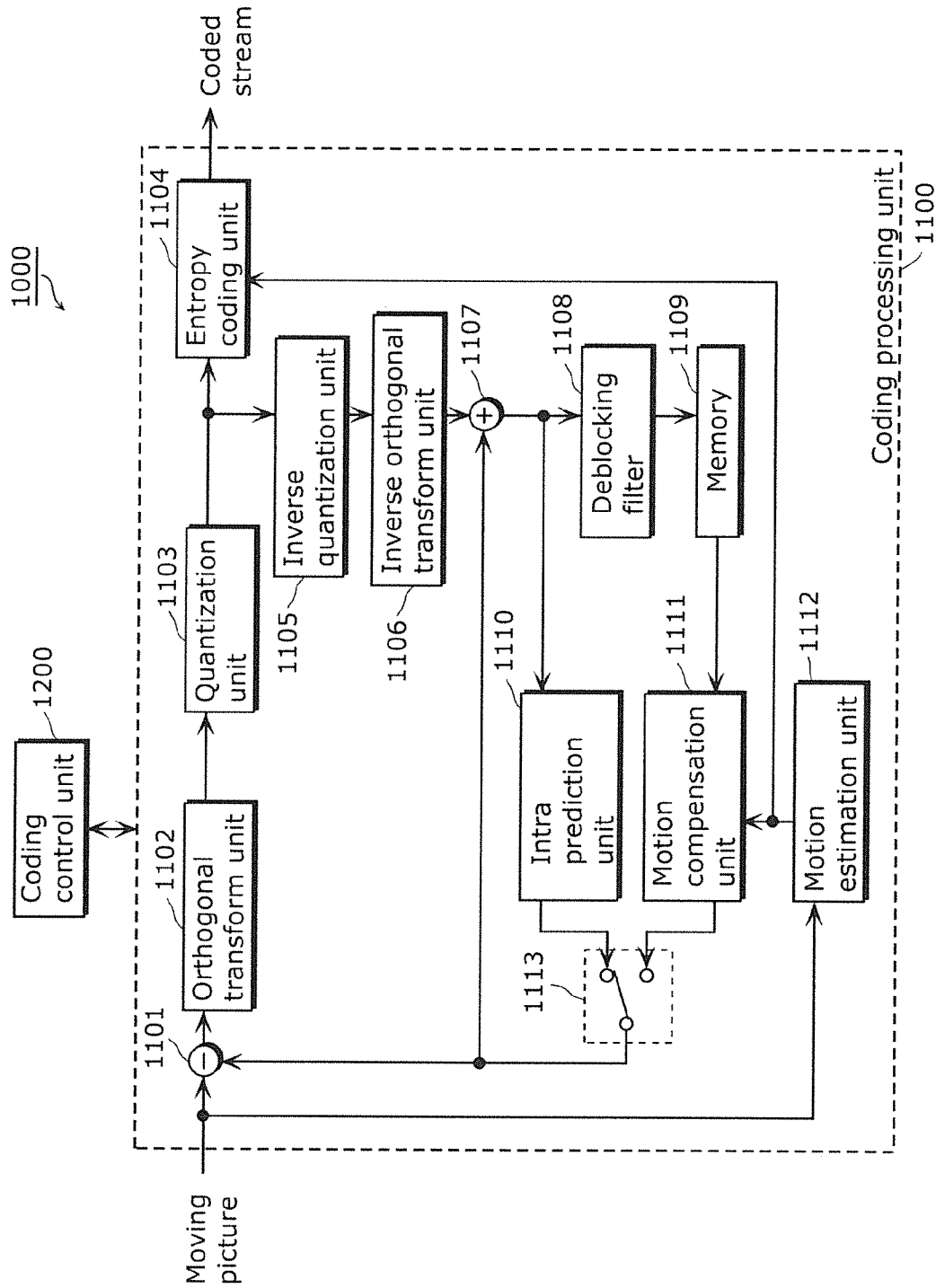
FIG. 2 is a block diagram showing the configuration of an image coding apparatus according to Embodiment 1 of the present invention.

FIG. 2 is a block diagram showing the configuration of an image coding apparatus according to the present embodiment.

An image coding apparatus 1000 includes a coding processing unit 1100 and a coding control unit 1200.

The coding processing unit 1100 generates a coded stream by coding moving pictures on a block-by-block basis. The coding processing unit 1100 includes a subtractor 1101, an orthogonal transform unit 1102, a quantization unit 1103, an entropy coding unit 1104, an inverse quantization unit 1105, an inverse orthogonal transform unit 1106, an adder 1107, a deblocking filter 1108, a memory 1109, an intra prediction unit 1110, a motion compensation unit 1111, a motion estimation unit 1112, and a switch 1113.

The subtractor 1101 obtains a moving picture and a prediction image from the switch 1113. The subtractor 1101 subtracts the prediction image from the current block to be coded included in the moving picture, to generate a difference image.

The orthogonal transform unit 1102 performs orthogonal transform such as discrete cosine transform on the difference image generated by the subtractor 1101, to transform the difference image into a coefficient block comprising a plurality of frequency coefficients. The quantization unit 1103 quantizes each of the frequency coefficients included in the coefficient block, to generate a quantized coefficient block.

The entropy coding unit 1104 generates a coded stream by performing entropy coding (variable length coding) on the coefficient block quantized by the quantization unit 1103 and a motion vector estimated by the motion estimation unit 1112.

The inverse quantization unit 1105 performs inverse quantization on the coefficient block quantized by the quantization unit 1103. The inverse orthogonal transform unit 1106 generates a decoded difference image by performing inverse orthogonal transform such as inverse discrete cosine transform on each of the frequency coefficients included in the inversely quantized coefficient block.

The adder 1107 generates a locally decoded image by obtaining a prediction image from the switch 1113 and by adding the prediction image and the decoded difference image which is generated by the inverse orthogonal transform unit 1106.

The deblocking filter 1108 removes block distortion of the locally decoded image generated by the adder 1107 and stores the locally decoded image in the memory 1109.

The intra prediction unit 1110 generates a prediction image by performing intra prediction on the current block to be coded using the locally decoded image generated by the adder 1107.

The motion estimation unit 1112 estimates a motion vector for the current block to be coded included in the moving picture, and outputs the estimated motion vector to the motion compensation unit 1111 and the entropy coding unit 1104.

The motion compensation unit 1111 performs motion compensation on the current block to be coded by referring to the image stored in the memory 1109 as a reference image and by using the motion vector estimated by the motion estimation unit 1112. The motion compensation unit 1111 generates, by the motion compensation, a prediction image with respect to the current block to be coded.

When intra predictive coding is performed on the current block to be coded, the switch 1113 outputs the prediction image generated by the intra prediction unit 1110 to the subtractor 1101 and the adder 1107. When inter predictive coding is performed on the current block to be coded, the switch 1113 outputs the prediction image generated by the motion compensation unit 1111 to the subtractor 1101 and the adder 1107.

The coding control unit 1200 controls the coding processing unit 1100. More specifically, the coding control unit 1200 determines a processing unit in which a quantization parameter is stored and hierarchy depth information for specifying the location of the processing unit. The quantization parameter is a parameter used for quantization by the quantization unit 1103 and inverse quantization by the inverse quantization unit 1105. The processing units according to the present embodiment are layered, and each of the processing units at any layer corresponds to the above described block. The hierarchy depth information is, for example, a parameter for specifying the layer having a processing unit in which a quantization parameter is stored. The coding control unit 1200 instructs the entropy coding unit 1104 to store a quantization parameter in the above determined processing unit and to store the hierarchy depth information in the header of the coded stream (for example, sequence header or picture header).

Figure 3:
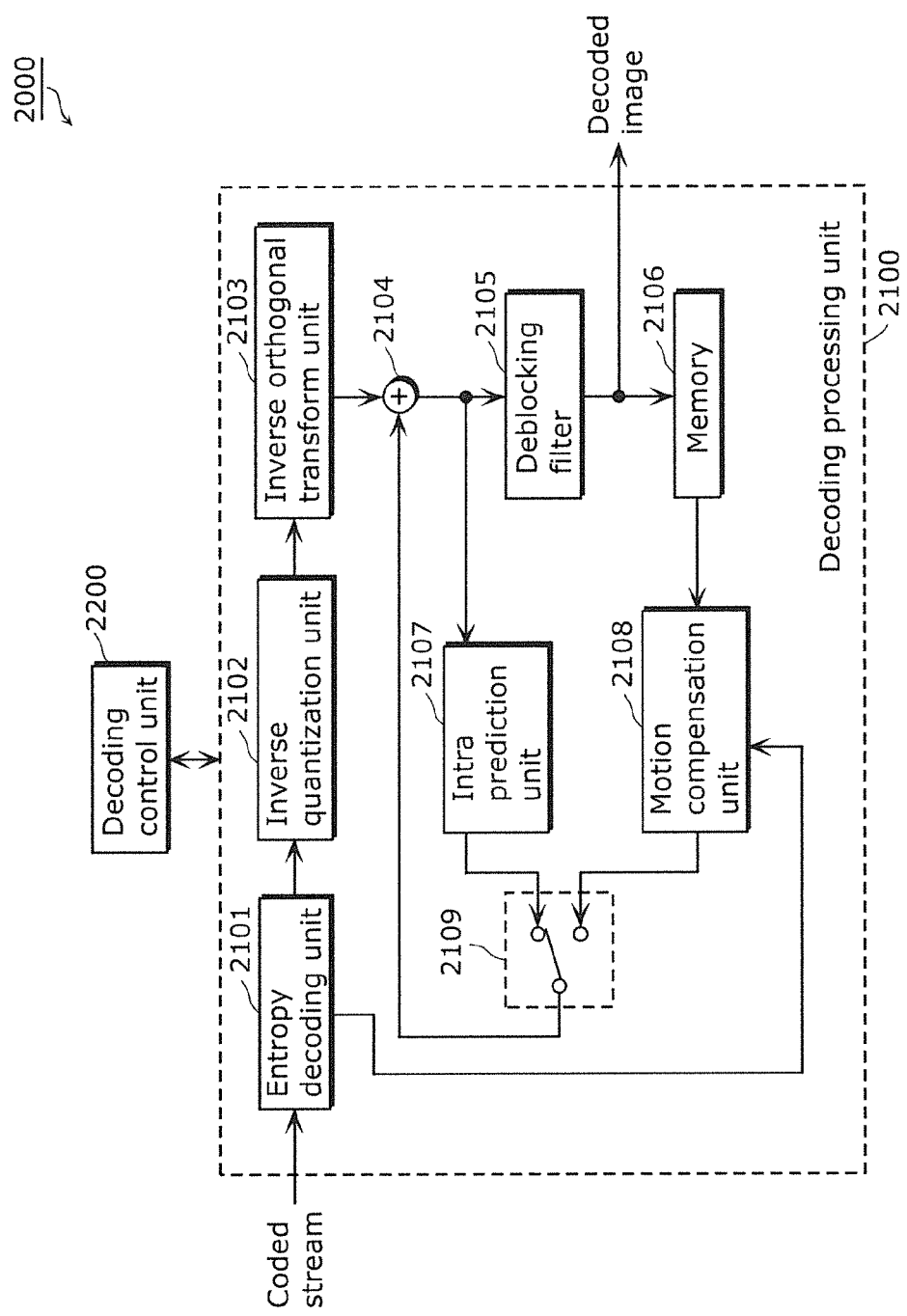
FIG. 3 is a block diagram showing the configuration of an image decoding apparatus according to Embodiment 1 of the present invention.

FIG. 3 is a block diagram showing the configuration of an image decoding apparatus according to the present embodiment.

An image decoding apparatus 2000 includes a decoding processing unit 2100 and a decoding control unit 2200.

The decoding processing unit 2100 generates a decoded image by decoding a coded stream on a block-by-block basis. The decoding processing unit 2100 includes an entropy decoding unit 2101, an inverse quantization unit 2102, an inverse orthogonal transform unit 2103, an adder 2104, a deblocking filter 2105, a memory 2106, an intra prediction unit 2107, a motion compensation unit 2108, and a switch 2109.

The entropy decoding unit 2101 obtains a coded stream and performs entropy decoding (variable length decoding) on the coded stream.

The inverse quantization unit 2102 performs inverse quantization on the quantized coefficient block generated by entropy decoding by the entropy decoding unit 2101. The inverse orthogonal transform unit 2103 generates a decoded difference image by performing inverse orthogonal transform such as inverse discrete cosine transform on each of the frequency coefficients included in the inversely quantized coefficient block.

The adder 2104 generates a decoded image by obtaining a prediction image from the switch 2109 and by adding the prediction image and the decoded difference image which is generated by the inverse orthogonal transform unit 2103.

The deblocking filter 2105 removes block distortion of the decoded image generated by the adder 2104, stores the decoded image in the memory 2106, and outputs the decoded image.

The intra prediction unit 1110 generates a prediction image by performing intra prediction on the current block to be decoded using the decoded image generated by the adder 2104.

The motion compensation unit 2108 performs motion compensation on the current block to be decoded by referring to the image stored in the memory 2106 as a reference image and by using the motion vector generated by entropy decoding by the entropy decoding unit 2101. The motion compensation unit 2108 generates, by the motion compensation, a prediction image with respect to the current block to be decoded.

When intra predictive coding is performed on the current block to be decoded, the switch 2109 outputs the prediction image generated by the intra prediction unit 2107 to the adder 2104. When inter predictive coding is performed on the current block to be decoded, the switch 2109 outputs the prediction image generated by the motion compensation unit 2108 to the adder 2104.

The decoding control unit 2200 controls the decoding processing unit 2100. More specifically, the decoding control unit 2200 parses the hierarchy depth information stored in the header of the coded stream (for example, sequence header or picture header), based on the result of the entropy decoding by the entropy decoding unit 2101. The decoding control unit 2200 identifies, based on the hierarchy depth information, the hierarchical layer having a processing unit in which a quantization parameter is stored and parses the quantization parameter included in the processing unit in the hierarchical layer. The decoding control unit 2200 instructs the inverse quantization unit 2102 to perform inverse quantization using the parsed quantization parameter.

Figure 4:
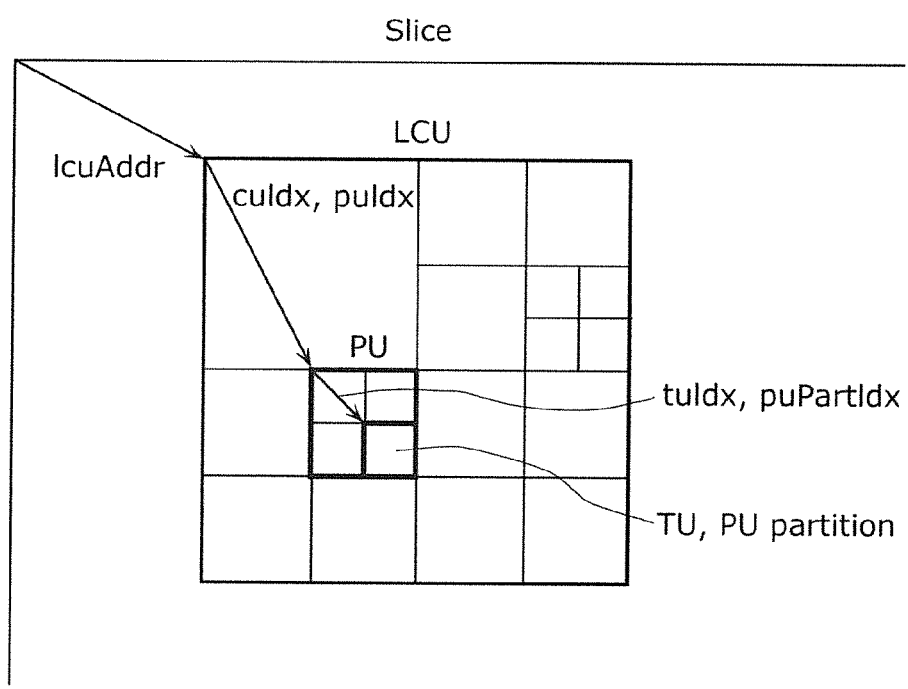
FIG. 4 is an illustration diagram for describing a multi-hierarchical block structure.

FIG. 4 is an illustration diagram for describing layered processing units (multi-hierarchical block structure).

The coding processing unit 1100 performs coding on the moving picture for each of the processing units, and the decoding processing unit 2100 decodes the coded stream for each of the processing units. The processing unit is split into small processing units, and the small processing units are layered such that each of the small processing units is split into smaller processing units. It should be noted that when the processing unit is smaller, the hierarchical layer in which the processing unit exists is deeper and lower and the value showing the hierarchical layer is greater. In contrast, when the processing unit is greater, the hierarchical layer in which the processing unit exists is shallow and is in high level and the value showing the hierarchical layer is small.

The processing unit includes a coding unit (CU), a prediction unit (PU), and a transform unit (TU). CU is a block of maximum 128×128 pixels, and corresponds to the conventional macroblock. PU is a basic unit for inter prediction. TU is a basic unit for orthogonal transform, and the size of TU is the same as the size of the PU or is smaller than the size of the PU by one hierarchical layer. CU is, for example, divided into four sub CUs, and one of the sub CUs includes the PU and the TU both having the same size as the sub CU (in this case, PU and TU are overlapping with each other). For example, the PU is further divided into four sub PUs, and TU is also further divided into four sub TUs. It should be noted that when the processing unit is divided into small processing units, the small processing unit is a sub-processing unit. For example, when the processing unit is CU, the sub-processing unit is a sub CU. When the processing unit is PU, the sub-processing unit is a sub PU. When the processing unit is TU, the sub-processing unit is a sub TU.

The following will describe the detail.

Pictures are divided into slices. A slice is a sequence of largest coding units. The location of the largest coding unit is specified by the largest coding unit address lcuAddr.

Each coding unit including the largest coding unit is divided into four coding units recursively. It results to the quadtree segmentation of the coding unit. The location of the coding unit is specified by the coding unit index cuIdx in which the upper-left sample (pixel or coefficient) of the largest coding unit is determined as an origin.

Once the coding unit is not allowed to be split, it is considered as the prediction unit. As similarly to the coding unit, the location of the prediction unit is specified by the prediction unit index puIdx in which the upper-left sample (pixel or coefficient) of the largest coding unit is determined as an origin.

The prediction unit may include multiple partitions (prediction unit partitions or sub PUs). The prediction unit partition is specified by the prediction partition index puPartIdx in which the upper-left sample of the prediction unit is determined as an origin.

The prediction unit may include multiple transform units. As similarly to the coding unit, the transform unit may be split into four small transform units (sub transform units) recursively. This allows quadtree segmentation of the residual signal. The location of the transform unit is specified by the transform unit index tuIdx in which the upper-left sample of the prediction unit is determined as an origin.

Here, the definitions of the processing units are as follows.

Coding tree block (CTB): A basic unit for specifying the quadtree segmentation of the given square region. CTB has various sizes of a square shape.

Largest coding tree block (LTCB): Coding tree block of the largest size allowed in the slice. A slice consists of non-overlapped LCTBs.

Smallest coding tree block (SCTB): Coding tree block of the smallest size allowed in the slice. SCTB is not allowed to be split into smaller CTBs.

Prediction unit (PU): A basic unit for specifying the prediction process. The size of PU is the same as that of the CU which is not allowed to be split anymore. PU can be split into multiple partitions which may have arbitrary shapes whereas CU is allowed to be split into four square shapes.

Transform unit (TU): A basic unit for specifying transform and quantization process.

Coding unit (CU): Same as coding tree block.

Largest coding unit (LCU): Same as largest coding tree block.

Smallest coding unit (SCU): Same as smallest coding tree block.

Moreover, the quantization parameters include one or more of the following parameters: delta quantization scale parameter (delta QP or QP delta), quantization offset parameter, an index (Qmatrix select idc), and quantization dead zone offset parameter. It should be noted that the index is to select a quantization scale matrix from a plurality of quantization scale matrixes.

The delta quantization scale parameter (delta QP or QP delta) is a difference between the quantization scale parameter to be applied to transform coefficients and the quantization scale parameter to be specified by sequence header or slice header (or the previous quantization scale parameter in a Z-scan order).

The quantization offset parameter is also called quantization offset and is an adjustment value (offset value) for rounding a signal when quantization is performed. Therefore, the image coding apparatus 1000 codes the quantization offset when quantization is performed, and the image decoding apparatus 2000 decodes the coded quantization offset. Then, the image decoding apparatus 2000 performs correction using the quantization offset when inverse quantization is performed on the transform coefficients.

Index (Qmatrix select idc) is also called adaptive quantization matrix and is an index indicating which quantization scaling matrix is used from a plurality of the quantization scaling matrixes. Moreover, Qmatrix select idc shows whether or not the quantization scaling matrix is used when there is only one quantization scaling matrix. It should be noted that the adaptive quantization matrix can be controlled on a block-by-block basis (processing unit).

The quantization dead zone offset parameter is also called adoptive dead zone, and is control information for adaptively changing the dead zone on a block-by-block basis. The dead zone is a width in which the frequency coefficients become zero by quantization (the previous width which becomes plus 1 or minus 1 after quantization).

Figure 5:
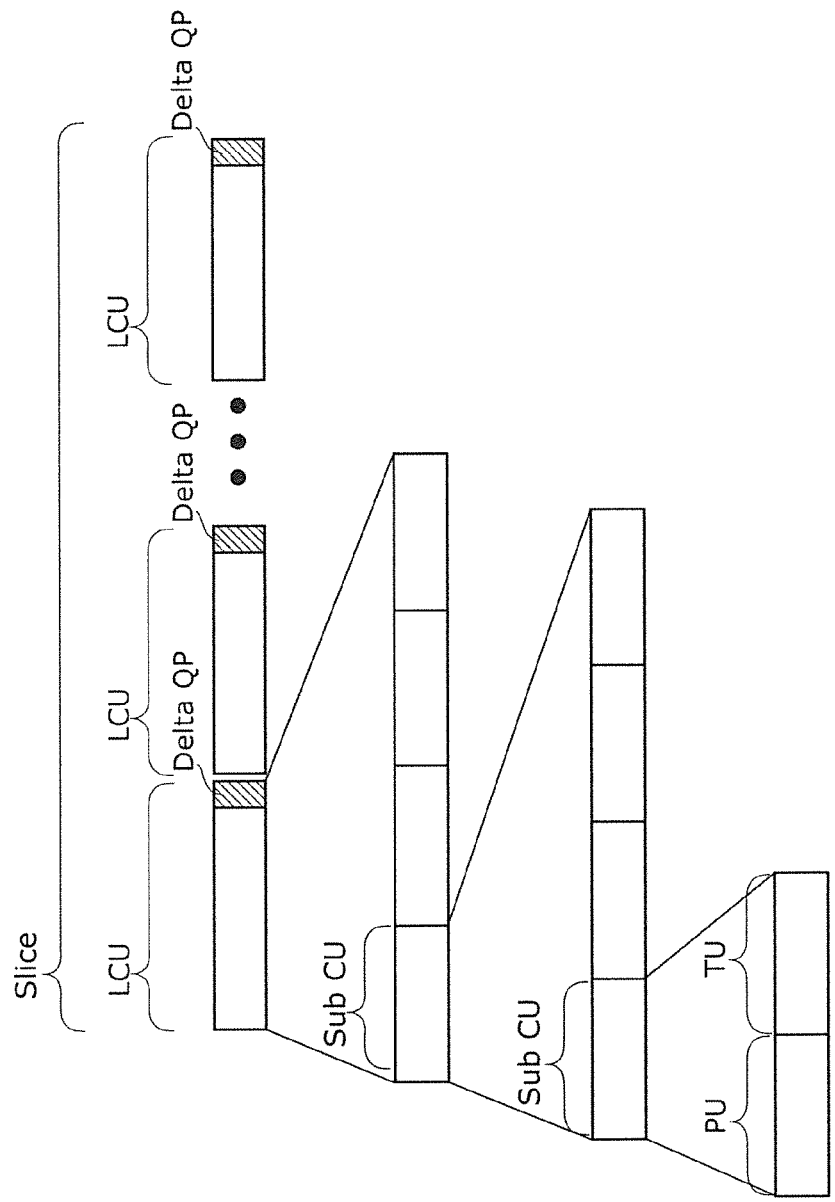
FIG. 5 is a diagram showing the configuration of a coded stream to be generated by TMuC software.

FIG. 5 is a diagram showing the configuration of a coded stream to be generated by TMuC software.

In a coded stream generated by software of Test Model Under Consideration (TMuC), delta QP is stored in LCU. In other words, in the coded stream, the same quantization parameter such as delta QP is applied to all coefficients included in LCU that is a large processing unit. As a result, the quantization parameter cannot be adjusted for a detail of the image, and image quality is decreased.

Therefore, in the coded stream generated by the image coding apparatus 1000 and decoded by the image decoding apparatus 2000 according to the present embodiment, the quantization parameter is stored in a processing unit which is located at a lower hierarchical layer that is deeper than LCU.

Figure 6C:
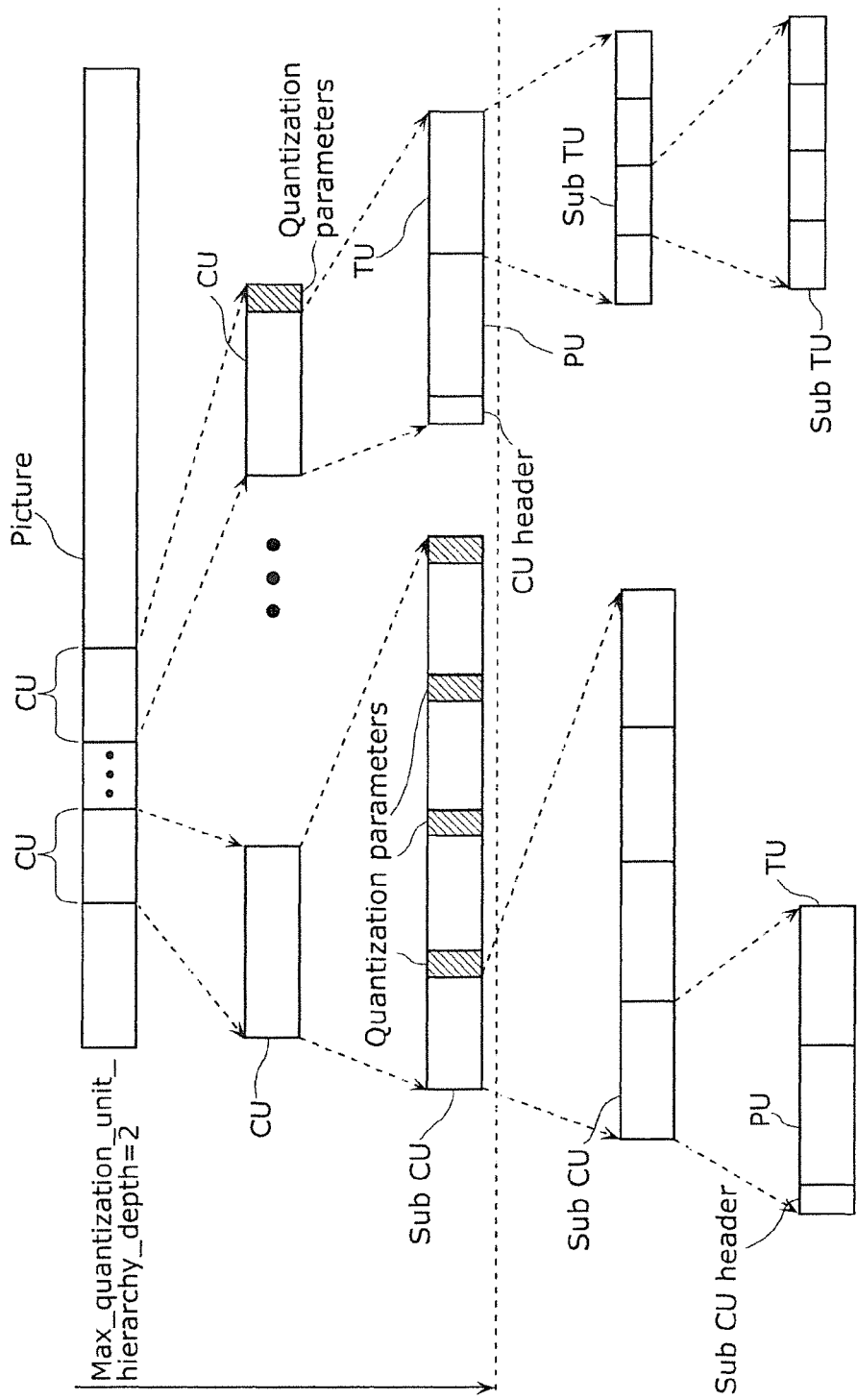
FIG. 6C is a diagram showing the configuration of a coded stream according to Embodiment 1 of the present invention.

FIGS. 6A, 6B, and 6C each are a diagram showing the configuration of a coded stream according to the present embodiment.

As shown in FIG. 6A, in the coded stream according to the present embodiment, LCU is split into four sub CUs, and delta QP to be applied to each of the sub CUs is stored in the sub CU. In other words, when LCU is the first hierarchical layer, delta QP is stored in CU which is located lower by two hierarchical layers from LCU. Moreover, in the sub CU, delta QP is disposed after all transform coefficients included in the sub CU.

Furthermore, in the coded stream according to the present embodiment, hierarchy depth information which indicates the lowest hierarchical layer of the processing unit (Max_quantization_unit_hierarchy_depth) in which delta QP is stored is stored in the sequence header. For example, Max_quantization_unit_hierarchy_depth=2.

The image coding apparatus 1000 generates and outputs the coded stream. Meanwhile, the image decoding apparatus 2000 identifies the processing unit in which delta QP is stored (sub CU located at the second hierarchical layer) by parsing the hierarchy depth information (Max_quantization_unit_hierarchy_depth) stored in the sequence header of the coded stream, and parses the delta QP stored in the processing unit. Then, the image decoding apparatus 2000 performs inverse quantization on the delta QP by applying the delta QP to each of the transform coefficients of the sub CU which stores the delta QP.

As shown in FIG. 6B, Qmatrix select idc may be stored instead of delta QP. Furthermore, as shown in FIG. 6C, the quantization parameter including delta QP and Qmatrix select idc may be stored.

Figure 7:
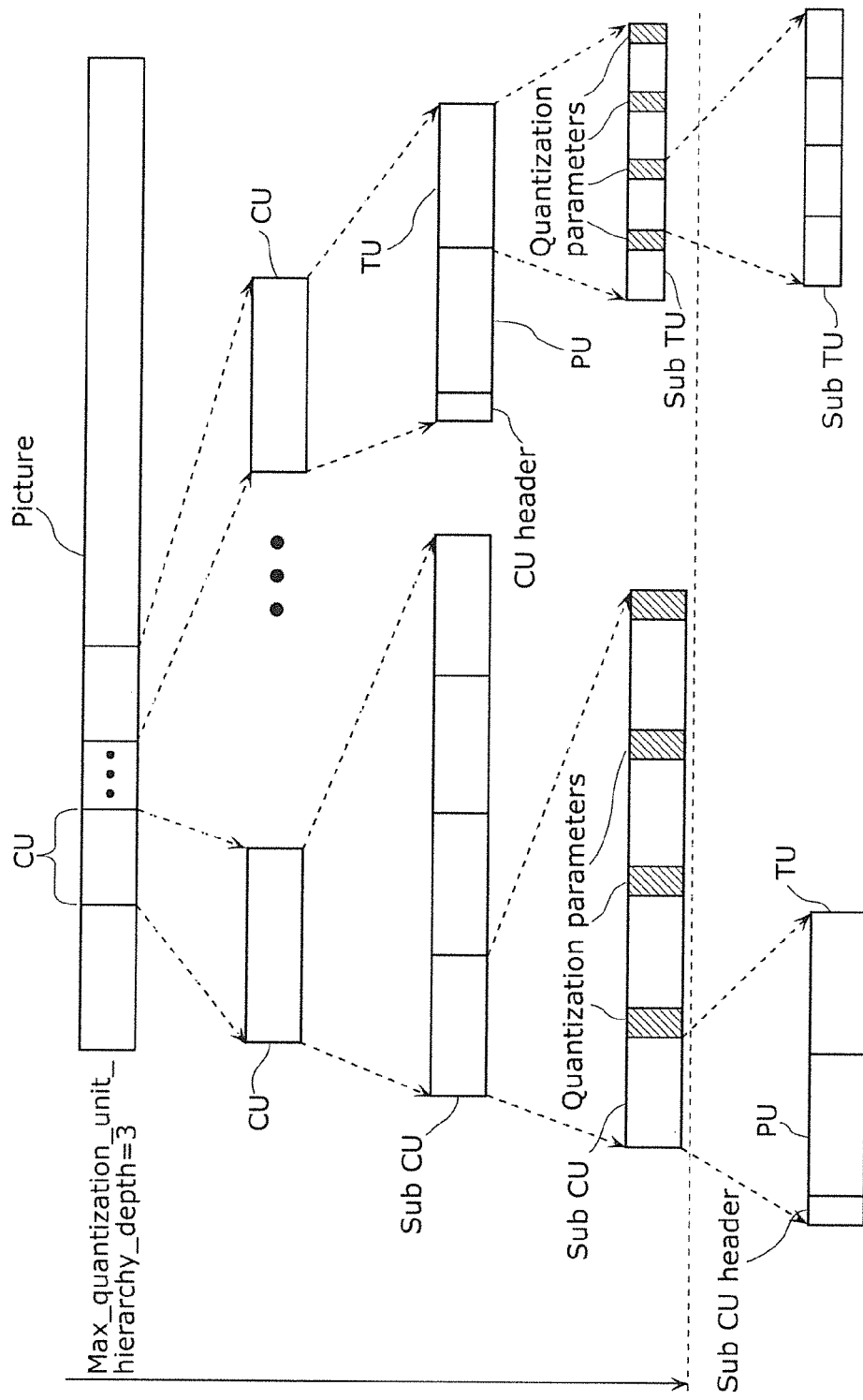
FIG. 7 is a diagram showing the configuration of another coded stream according to Embodiment 1 of the present invention.

FIG. 7 is a diagram showing the configuration of another coded stream according to the present embodiment.

In the coded stream shown in FIGS. 6A to 6C, the quantization parameter is stored in the sub CU located at the second hierarchical layer. However, as shown in FIG. 7, the quantization parameter may be stored in the sub CU or the sub TU located at the deeper third hierarchical layer (Max_quantization_unit_hierarchy_depth=3).

Figure 8A:
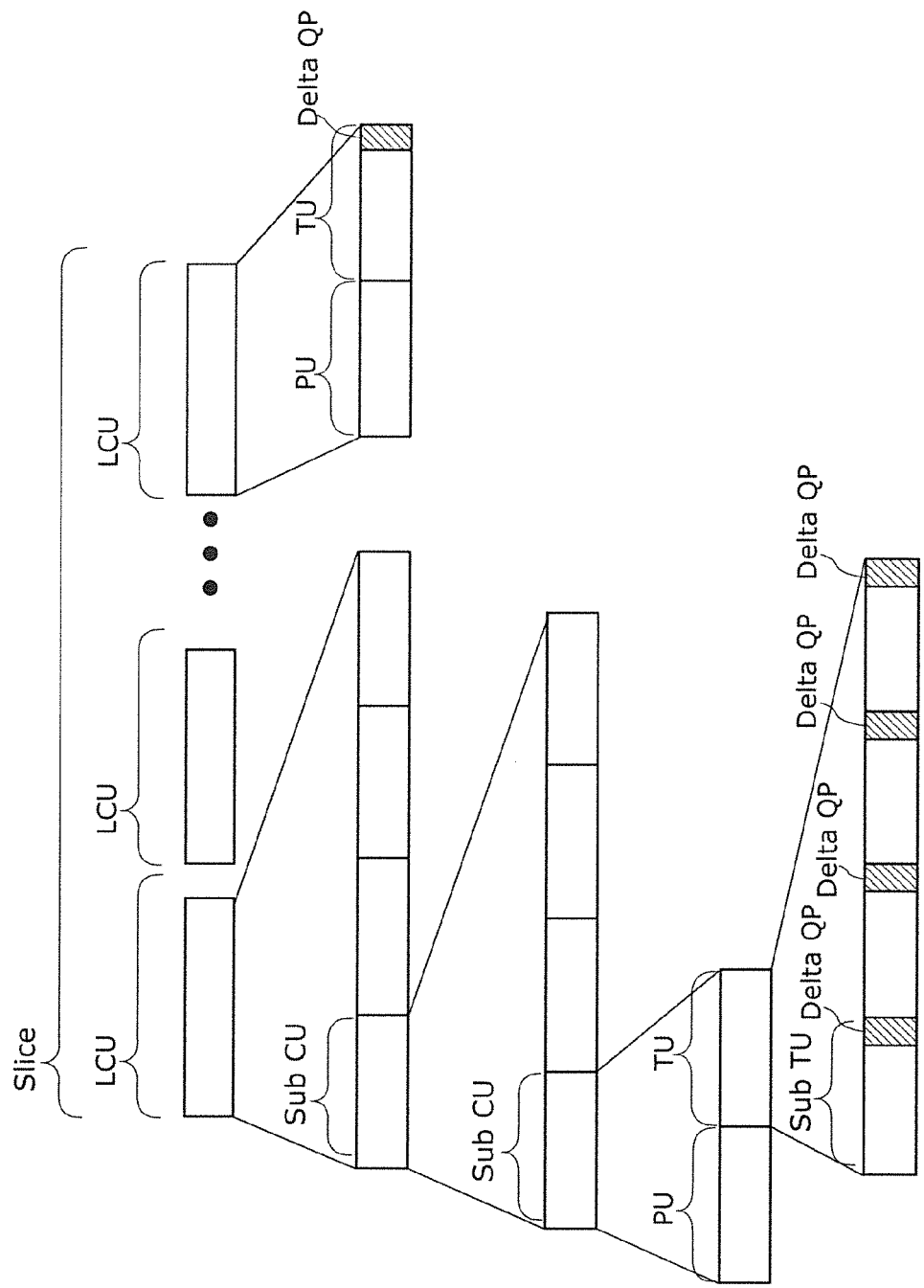
FIG. 8A is a diagram showing the configuration of a still another coded stream according to Embodiment 1 of the present invention.
Figure 8B:
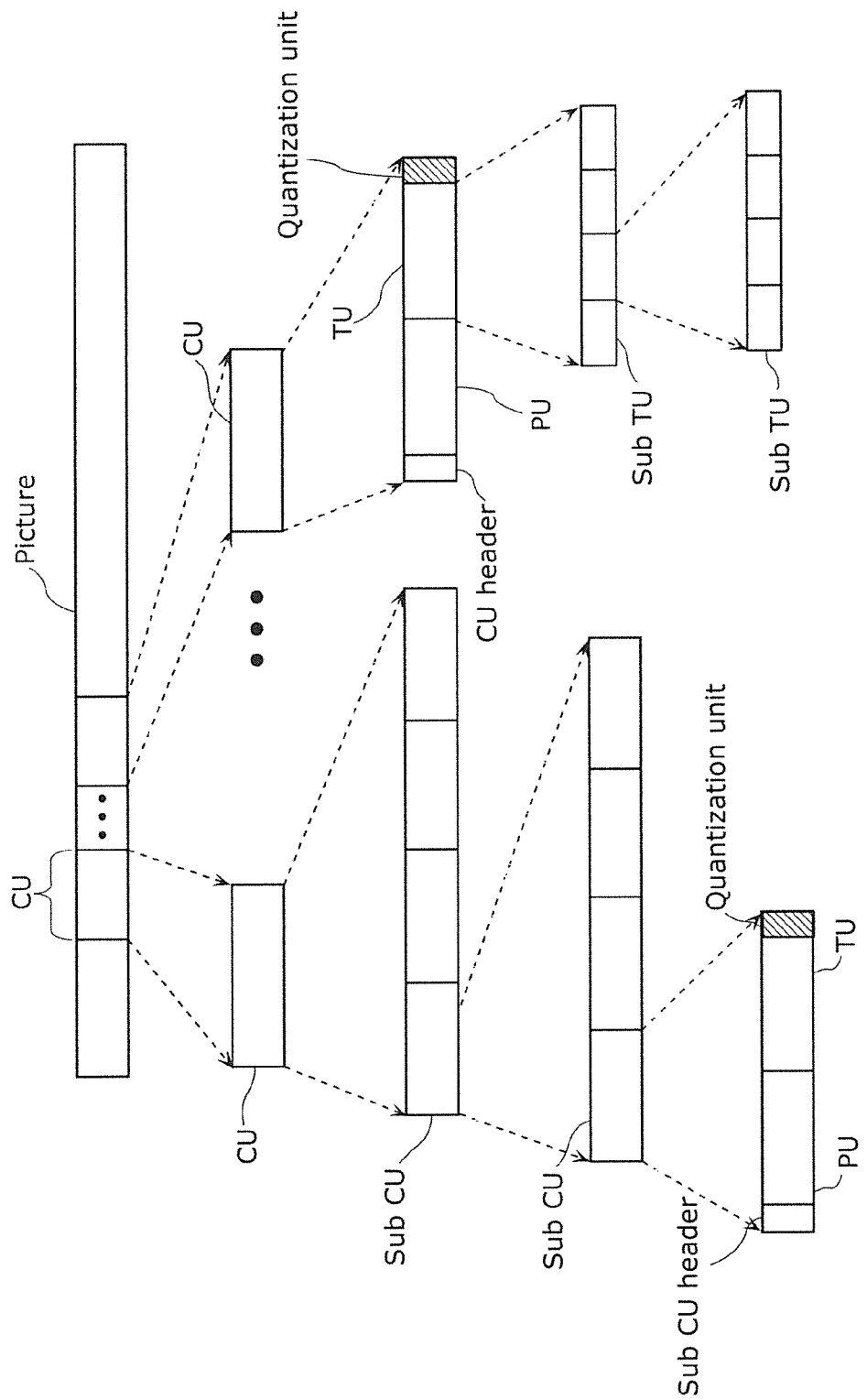
FIG. 8B is a diagram showing the configuration of a still another coded stream according to Embodiment 1 of the present invention.

FIGS. 8A and 8B each are a diagram showing the configuration of a still another coded stream according to the present embodiment.

In the coded stream shown in FIG. 8A, the delta QP to be applied to TU or sub TU is stored in the TU or the sub TU. In the TU or the sub TU, the delta QP is disposed after all the transform coefficients included in the TU or the sub TU.

Moreover, as shown in FIG. 8B, the quantization parameter other than delta QP and the quantization parameter including delta QP and Qmatrix select idc may be stored as a quantization unit.

Figure 9A:
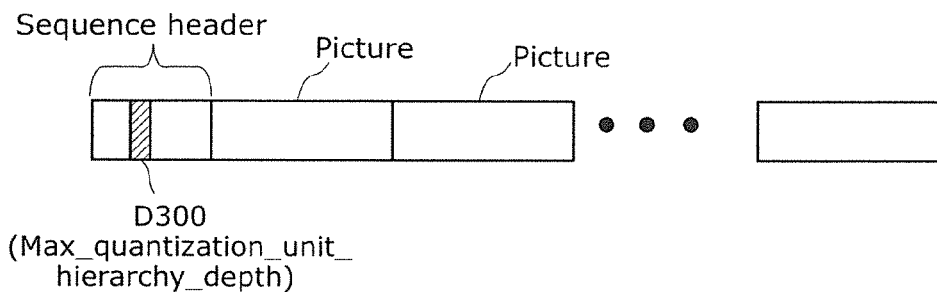
FIG. 9A is a diagram showing the storage position of Max_quantization_unit_hierarchy_depth according to Embodiment 1 of the present invention.
Figure 9B:
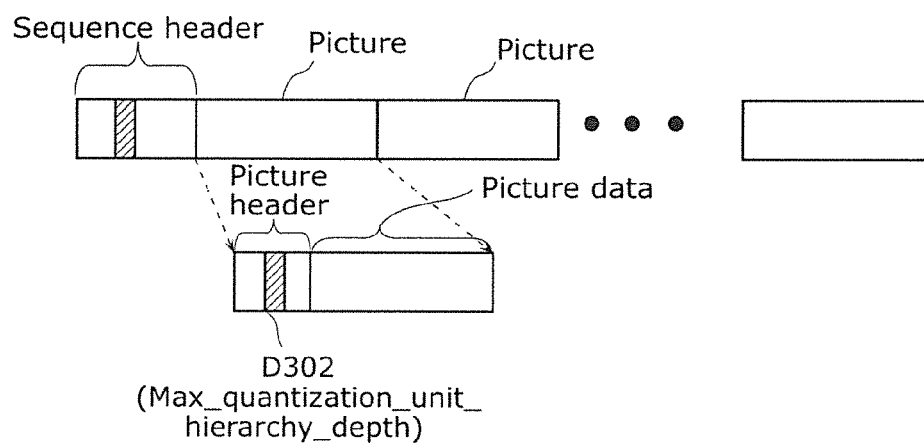
FIG. 9B is a diagram showing the storage position of Max_quantization_unit_hierarchy_depth according to Embodiment 1 of the present invention.
Figure 10A:
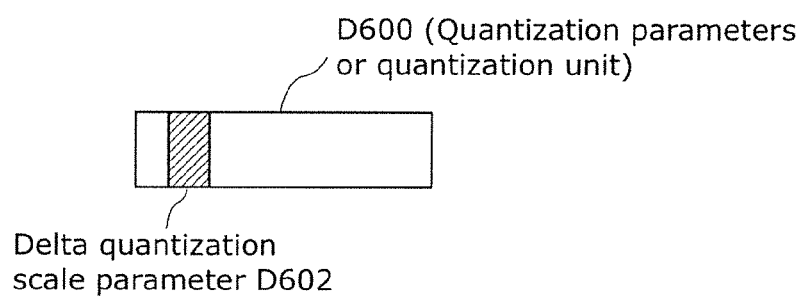
FIG. 10A is a diagram showing a delta quantization scale parameter according to Embodiment 1 of the present invention.
Figure 10B:
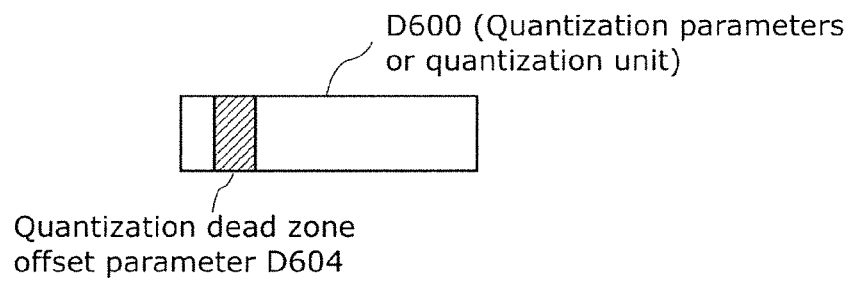
FIG. 10B is a diagram showing a quantization dead zone offset parameter according to Embodiment 1 of the present invention.
Figure 10C:
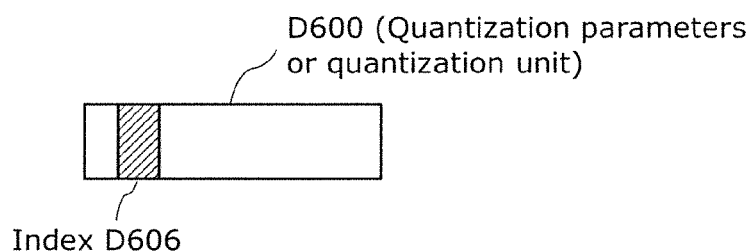
FIG. 10C is a diagram showing an index according to Embodiment 1 of the present invention.
Figure 10D:
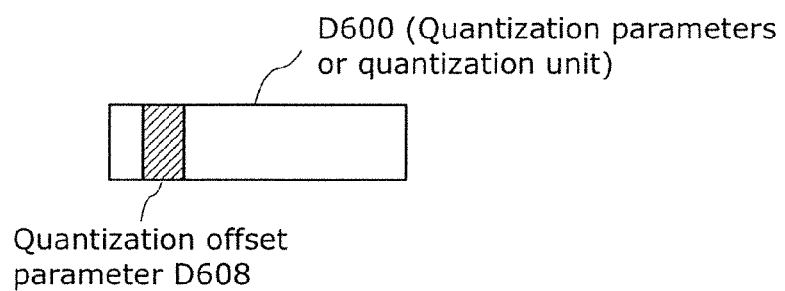
FIG. 10D is a diagram showing a quantization offset parameter according to Embodiment 1 of the present invention.

FIGS. 9A and 9B each are a diagram showing the storage location of Max_quantization_unit_hierarchy_depth.

Max_quantization_unit_hierarchy_depth D300 is stored in the sequence header as shown in FIG. 9A. Moreover, Max_quantization_unit_hierarchy_depth D302 is stored in the picture header as shown in FIG. 9B. In other words, the image coding apparatus 1000 writes hierarchy depth information into the picture header for a picture comprising a plurality of processing units. As a result, hierarchy depth information is stored in the picture header.

FIGS. 10A to 10D are each a diagram for describing types of quantization parameters.

Quantization parameter or quantization unit D600, as shown in FIGS. 10A to 10D, includes at least one of delta quantization scale parameter D602, quantization dead zone offset parameter D604, index D606, and quantization offset parameter D608. It should be noted that delta quantization scale parameter D602 is delta QP, and index D606 is Qmatrix select idc (adaptive quantization matrix).

Figure 11:
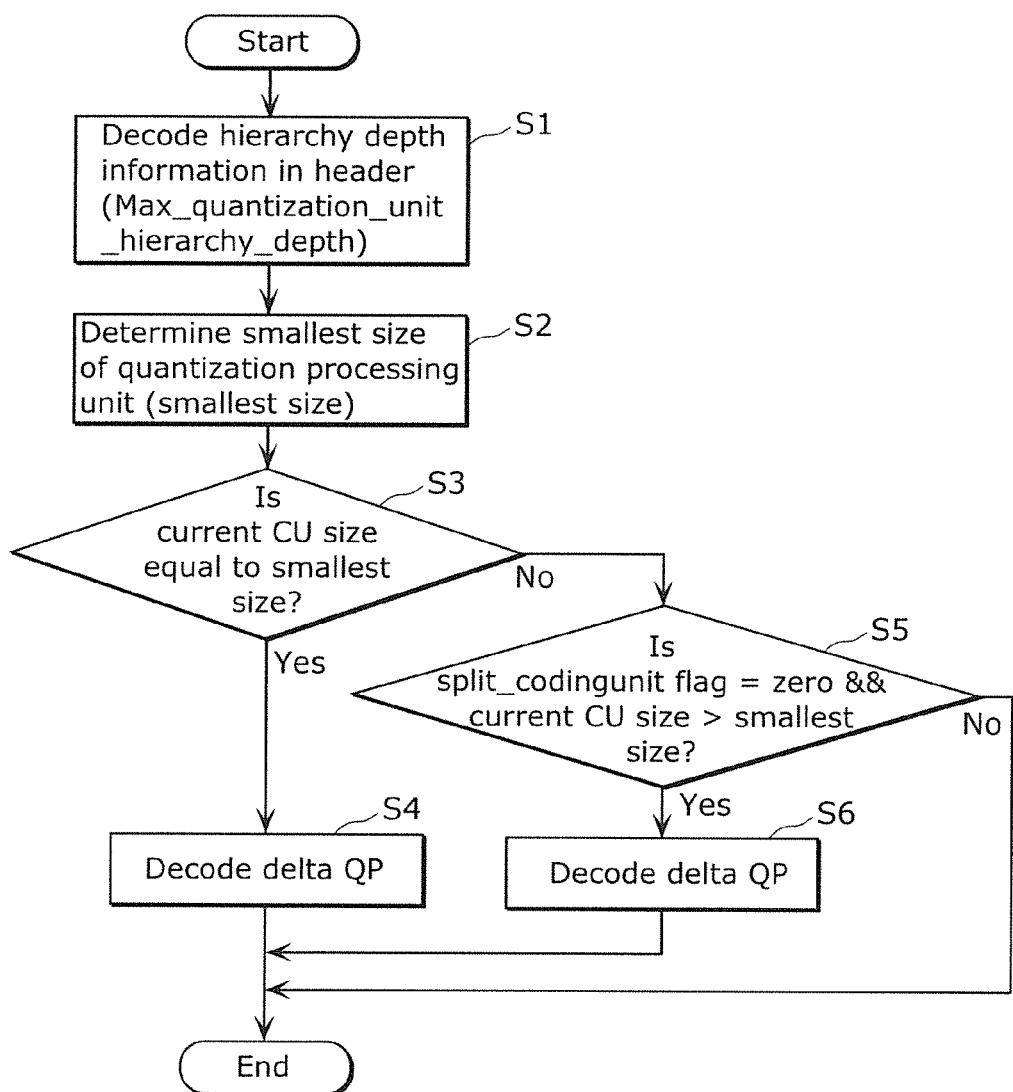
FIG. 11 is a flowchart showing decoding of delta QP by the image decoding apparatus according to Embodiment 1 of the present invention.

FIG. 11 is a flowchart showing decoding of delta QP by the imaging decoding apparatus 2000.

First, the image decoding apparatus 2000 decodes hierarchy depth information (Max_quantization_unit_hierarchy_depth) stored in the header (Step S1), and determines the smallest size of the quantization processing unit (minimum quantization unit) (Step S2). Next, the image decoding apparatus 2000 determines whether or not the current CU to be decoded has the size (Step S3). Here, when it is determined that the current CU to be decoded has the size of minimum quantization unit (Yes in Step S3), the image decoding apparatus 2000 decodes delta QP stored in the CU (Step S4). Meanwhile, when it is determined that the current CU to be decoded does not have the size of minimum quantization unit (No in Step S3), the image decoding apparatus 2000 further determines whether or not the flag of the current CU to be decoded (split_coding_unit flag) is zero and the size of the current CU to be decoded is larger than the size of minimum quantization unit (Step S5). It should be noted that when the above described split_coding_unit flag is zero, this shows that the flag cannot be further split. When the above described split_coding_unit flag is one, this shows that the flag can split the CU further. In other words, the image decoding apparatus 2000, in Step S5, determines whether or not the current CU to be decoded cannot be further split and the current CU to be decoded is located higher than the hierarchical layer indicated by the hierarchy depth information. Here, it is determined that the flag is zero and the size of the current CU to be decoded is large (Yes in Step S5), the image decoding apparatus 2000 decodes delta QP stored in the current CU to be decoded (Step S6).

Figure 12:
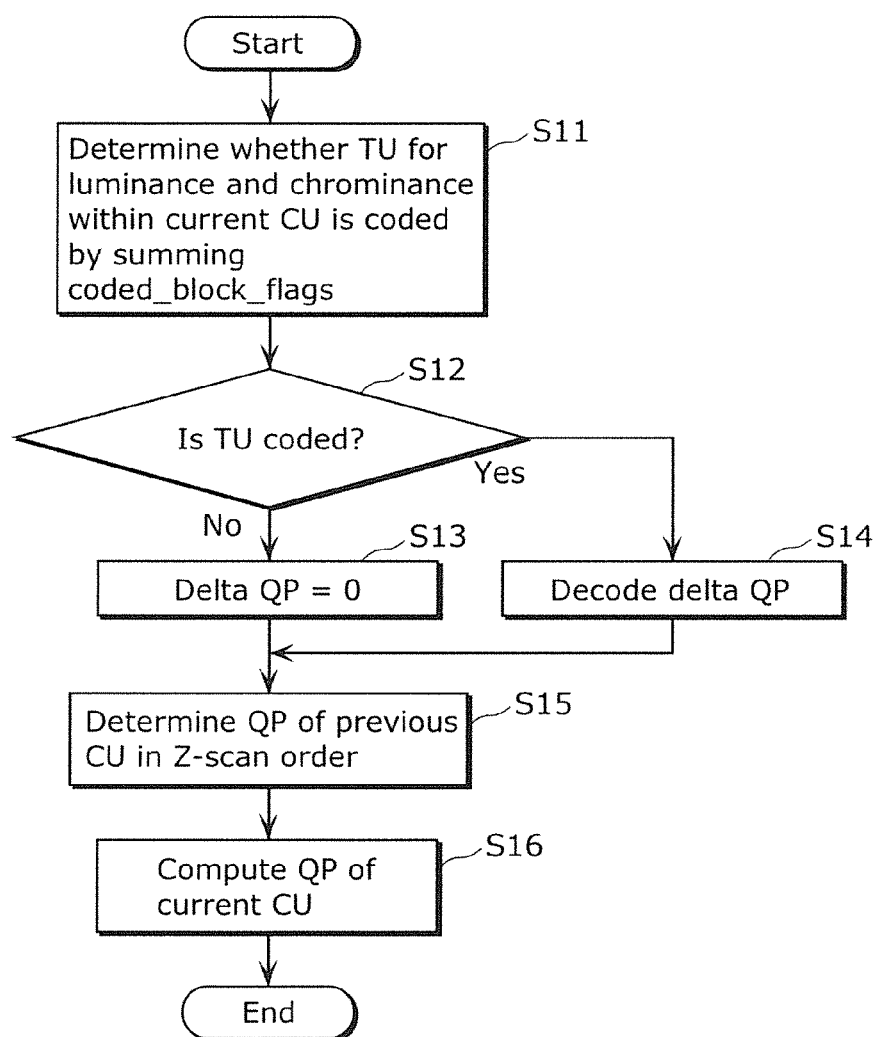
FIG. 12 is a flowchart showing computation of QP by the image decoding apparatus according to Embodiment 1 of the present invention.

FIG. 12 is a flowchart showing computation of delta QP (quantization scale parameter) by the imaging decoding apparatus 2000.

First, the image decoding apparatus 2000 determines, by summing coded_block_flag (CBF) in each TU in the quartered processing unit, whether or not the TU for luminance and chrominance included in the current TU to be decoded is coded (Steps S11 and S12). It should be noted that each of the TUs stores the above described coded_block_flag that is a flag showing whether or not it is a transform coefficient. Here, when it is determined the TU is coded (Yes in Step S12), the image decoding apparatus 2000 decodes delta QP included in the TU (Step S14). Meanwhile, when it is determined that the TU is not coded (No in Step S12), the image decoding apparatus 2000 sets delta QP to zero (Step S13). Furthermore, the image decoding apparatus 2000 determines QP of the previous CU in a Z-scan order (Step S15), and computes QP of the current CU to be decoded (Step S16).

As described above, when the processing units are hierarchically layered, the image coding apparatus 1000 according to the present embodiment can write a different parameter (for example, quantization parameter) which is different for each of the small processing units that are located at the lower hierarchical layers. As a result, the image decoding apparatus 2000 can decode the processing units by applying a different parameter to each of the small processing units, and therefore image quality can be improved. Moreover, by writing, into a header, the hierarchy depth information for specifying the hierarchical layer having a processing unit in which a parameter necessary for decoding is stored, the hierarchical layer can be notified to the image decoding apparatus 2000. Therefore, the hierarchical layer can be set at an arbitrary hierarchical layer without limiting the hierarchical layer to the lowest hierarchical layer. Therefore, the amount of coding for all parameters included in a coded stream can be reduced compared with the case where a parameter is stored for each of the smallest processing unit located at the lowest hierarchical layer, and coding efficiency can be improved. With this, image quality and coding efficiency can be improved simultaneously. Moreover, since the image decoding apparatus 2000 identifies, by parsing the hierarchy depth information, a hierarchical layer having a processing unit in which a parameter is stored is specified, it is possible for the image decoding apparatus 2000 to reduce the burden of a process of searching the processing unit in which the parameter is stored and to appropriately decode the coded stream generated by the image coding apparatus 1000. It should be noted that in the present embodiment, quantization parameter is cited as an example of parameter. However, any form of parameter is acceptable.

Modification 1

Figure 13:
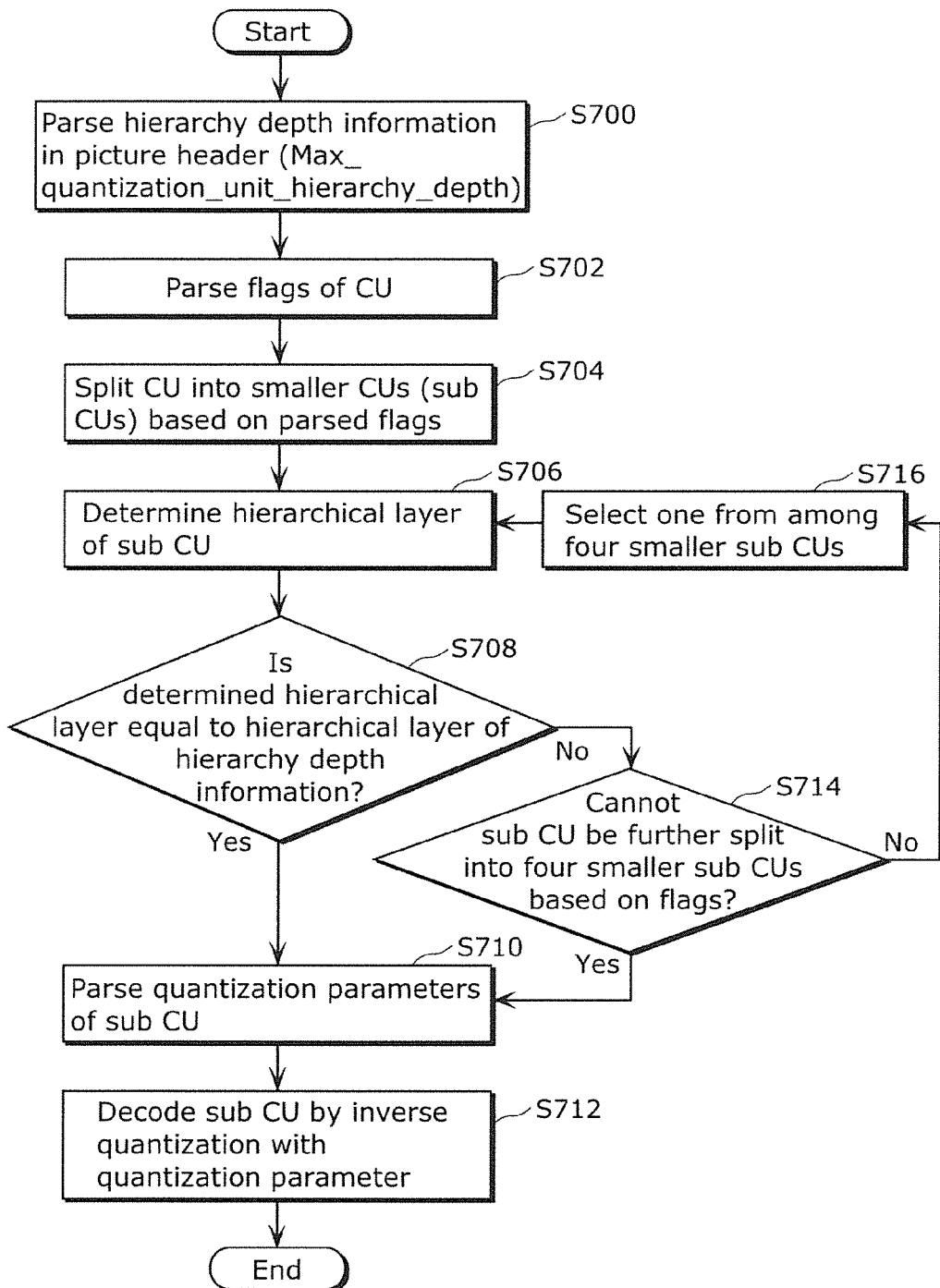
FIG. 13 is a flowchart showing decoding by the image decoding apparatus according to Modification 1 of Embodiment 1 of the present invention.

FIG. 13 is a flowchart of decoding by an image decoding apparatus 2000 according to Modification 1 of the present embodiment.

The image decoding apparatus 2000 first parses hierarchy depth information (Max_quantization_unit_hierachy_depth) stored in the picture header (Step S7000), and parses the flag of CU (Step S702). Next, the image decoding apparatus 2000, based on the parsed flag, splits the CU into smaller sub CUs (Step S704). Then, the image decoding apparatus 2000 determines the hierarchical layer of the sub CU (Step S706) and determines whether or not the determined hierarchical layer matches the hierarchical layer indicated by Max_quantization_unit_hierarchy_depth (Step S708).

When it is determined that the determined layer matches the hierarchical layer specified by Max_quantization_unit_hierarchy_depth (Yes in Step S708), the image decoding apparatus 2000 parses quantization parameter stored in the sub CU (Step S710) and decodes the sub CU by performing inverse quantization with the parsed quantization parameter (Step S712).

Meanwhile, when it is determined in Step S708 that the determined layer does not match the hierarchical layer specified by Max_quantization_unit_hierarchy_depth (No in Step S708), the image decoding apparatus 2000 determines whether the sub CU cannot be further split into four smaller sub CUs, based on the above described flag (Step S714). Here, when it is determined that the sub CU cannot be further split (Yes in Step S714), the image decoding apparatus 2000 performs the processes of the above described Steps S710 and S712 on the sub CU. Meanwhile, when it is determined that the sub CU can be further split (No in Step S714), the image decoding apparatus 2000 selects any one of the four smaller sub CUs (Step S716), and performs the processes from S706 on the selected sub CU.

Figure 14:
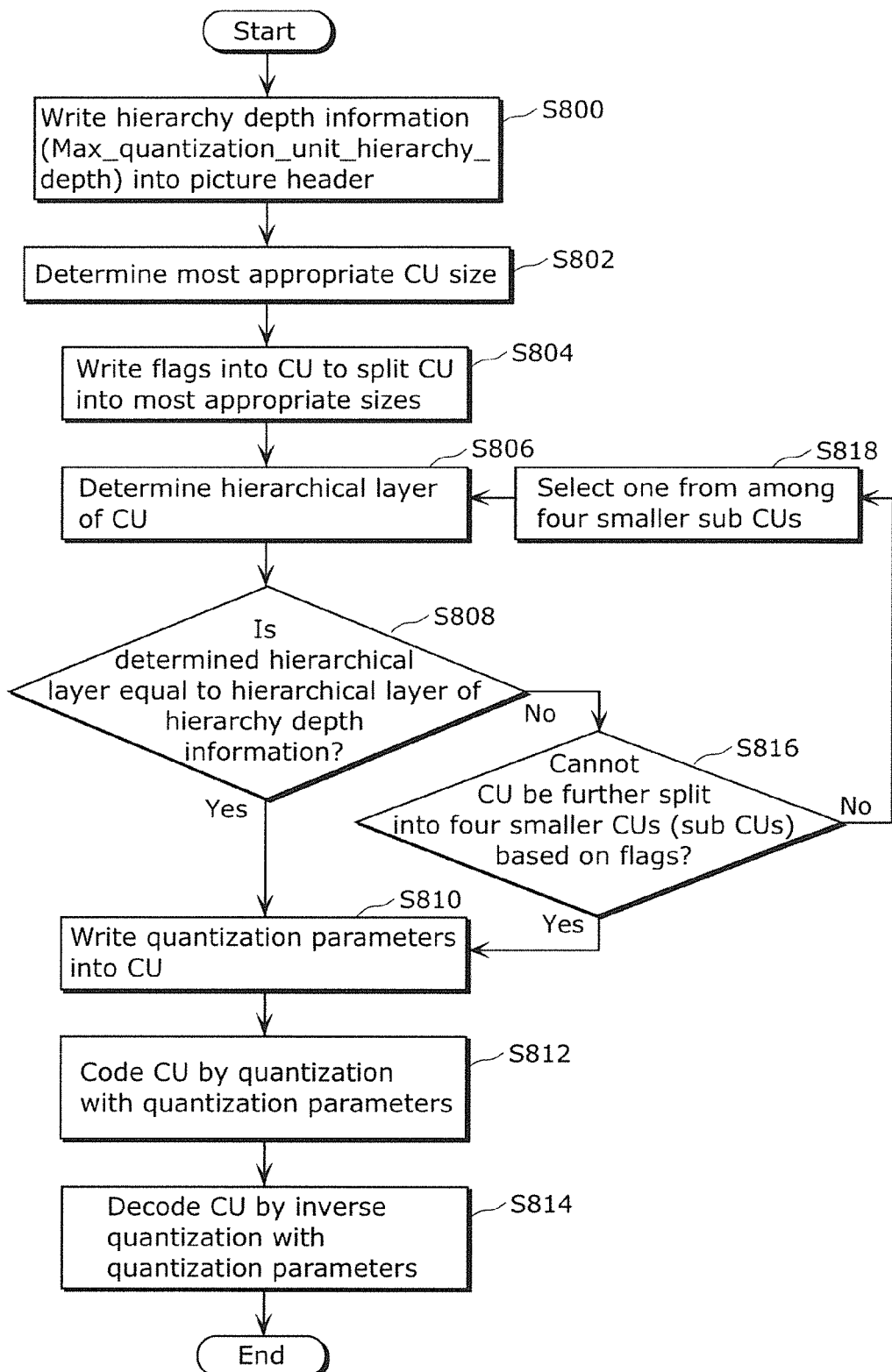
FIG. 14 is a flowchart showing coding by the image coding apparatus according to Modification 1 of Embodiment 1 of the present invention.

FIG. 14 is a flowchart of coding by an image coding apparatus 1000 according to Modification 1 of the present embodiment.

First, the image coding apparatus 1000 writes hierarchy depth information (Max_quantization_unit_hierarchy_depth) into the picture header (Step S800), and determines the most appropriate size for splitting the CU (Step S802). Next, the image coding apparatus 1000 writes, into the CU, flag for splitting the CU into processing units of the determined size (Step S804). Then, the image coding apparatus 1000 determines the hierarchical layer of the processing unit to be coded (CU or sub CU) (Step S808), and determines whether or not the determined hierarchical layer matches the hierarchical layer indicated by Max_quantization_unit_hierarchy_depth that is previously written (Step S808).

When it is determined that they match with each other (Yes in Step S808), the image coding apparatus 1000 writes quantization parameter into the processing unit (CU or sub CU) (Step S810), the image coding apparatus 1000 codes the processing unit by performing quantization using the written quantization parameter (Step S812). Furthermore, the image coding apparatus 1000 performs inverse quantization using the written quantization parameter to decode the coded processing unit (Step S814).

Meanwhile, when it is determined in Step S808 that they do not match with each other (No in Step S808), the image coding apparatus 1000 determines whether the processing unit cannot be further split into four smaller sub CUs, based on the above described flag (Step S816). Here, when it is determined that the sub CU cannot be further split (Yes in Step S816), the image coding apparatus 1000 performs the above described steps starting from Step S810 on the processing unit. Meanwhile, when it is determined that the sub CU can be further split (No in Step S816), the image coding apparatus 1000 selects any one of the four smaller sub CUs (Step S818), and performs the processes from S806 on the selected sub CU.

Modification 2

Figure 15A:
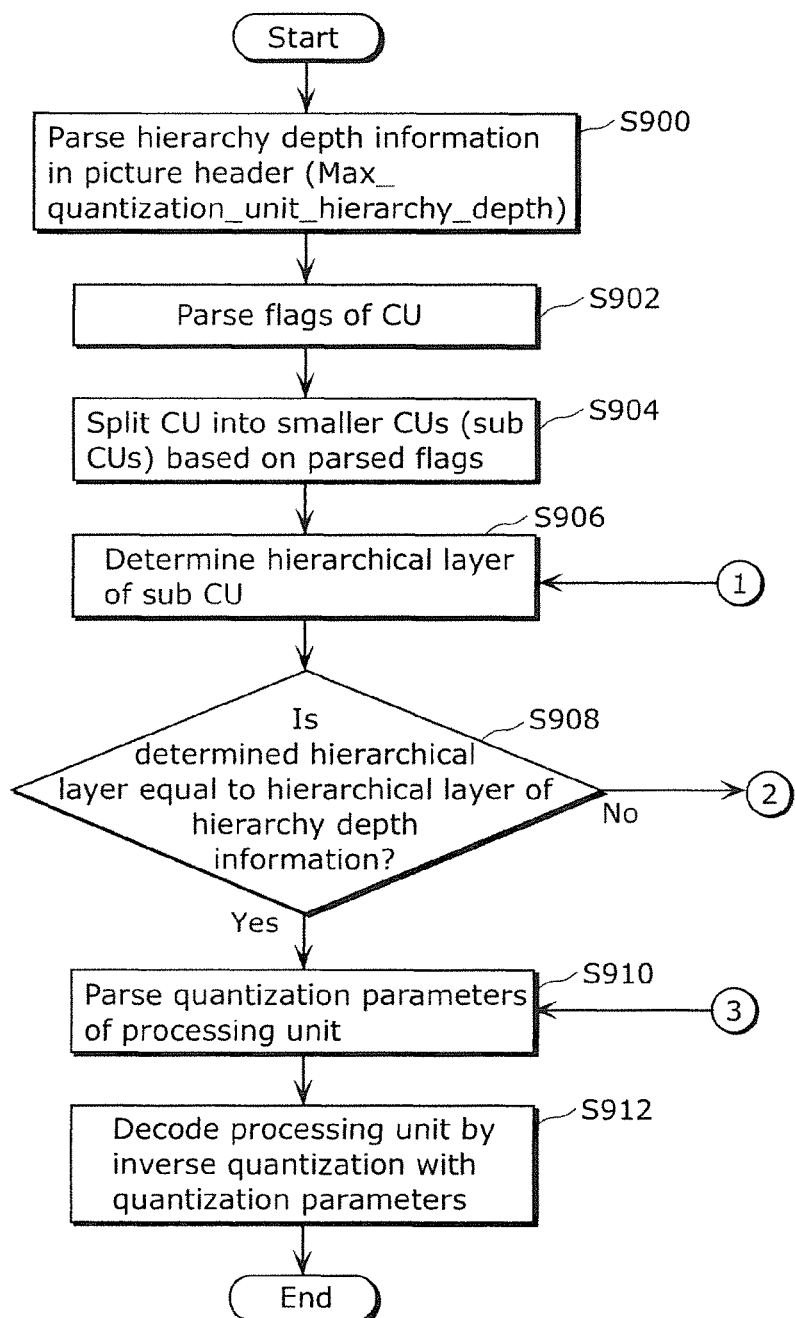
FIG. 15A is a flowchart showing decoding by the image decoding apparatus according to Modification 2 of Embodiment 1 of the present invention.
Figure 15B:
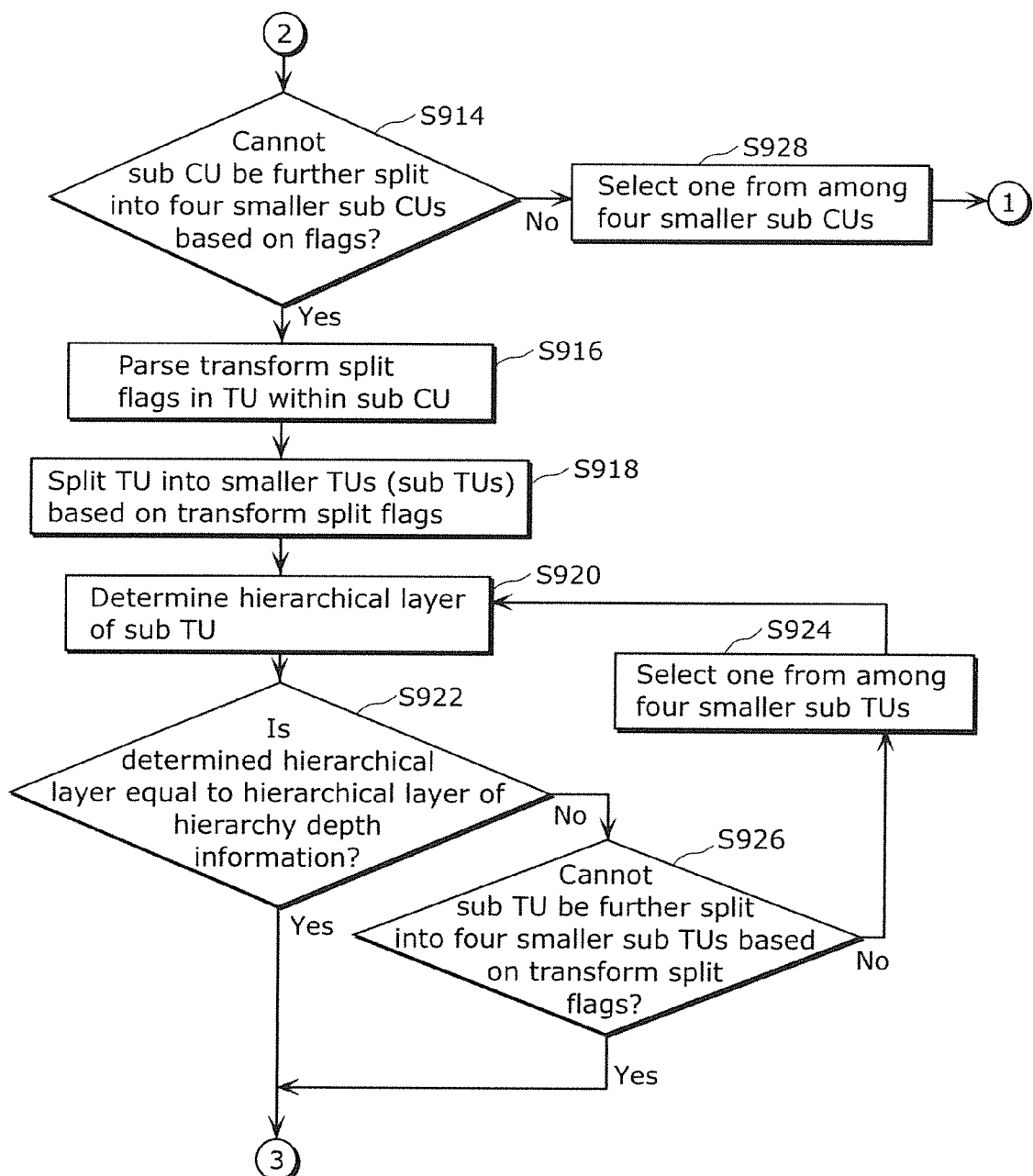
FIG. 15B is a flowchart showing decoding by the image decoding apparatus according to Modification 2 of Embodiment 1 of the present invention.

FIGS. 15A and 15B are each a flowchart of decoding by an image decoding apparatus 2000 according to Modification 2 of the present embodiment.

The image decoding apparatus 2000 first parses hierarchy depth information (Max_quantization_unit_hierachy_depth) stored in the picture header (Step S900), and parses the flag of CU (Step S902). Next, the image decoding apparatus 2000, based on the parsed flags, splits the CU into smaller sub CUs (Step S904). Then, the image decoding apparatus 2000 determines the hierarchical layer of the sub CU (Step S906) and determines whether or not the determined hierarchical layer matches the hierarchical layer indicated by Max_quantization_unit_hierarchy_depth (Step S908).

When it is determined that they match with each other (Yes in Step S908), the image decoding apparatus 2000 parses the quantization parameter stored in the sub CU (processing unit) (Step S910) and decodes the sub CU by performing inverse quantization with the parsed quantization parameter (Step S912).

Meanwhile, when it is determined in Step S908 that they do not match with each other (No in Step S908), the image decoding apparatus 2000 determines whether the sub CU cannot be further split into four smaller sub CUs, based on the above described flag (Step S914). When it is determined that the sub CU can be further split (No in Step S914), the image decoding apparatus 2000 selects any one of the four smaller sub CUs (Step S928) and performs the processes from S906 on the selected sub CU.

Meanwhile, when it is determined in Step 914 that the sub CU cannot be further split (Yes in Step S914), the image decoding apparatus 2000 parses transform split flag located within the TU of the sub CU (Step S916), and splits the TU into sub TUs that are smaller processing units, based on the parsed transform split flag (Step S918). Furthermore, the image decoding apparatus 2000 determines the hierarchical layer from LCU with respect to the sub TU (Step S920) and determines whether or not the determined hierarchical layer matches the hierarchical layer indicated by Max_quantization_unit_hierarchy_depth (Step S922).

When it is determined that they match with each other (Yes in Step S922), the image decoding apparatus 2000 performs the processes from S910 on the sub TU. Meanwhile, when it is determined in Step S922 that they do not match with each other (No in Step S922), the image decoding apparatus 2000 determines whether the sub TU cannot be further split into four smaller sub TUs, based on the above described transform split flag (Step S926). When it is determined that the sub TU can be further split (No in Step S926), the image decoding apparatus 2000 selects any one of the four smaller sub TUs (Step S924) and performs the processes from S920 on the selected sub TU. When it is determined that the sub TU cannot be further split (Yes in Step S926), the image decoding apparatus 2000 performs the processes from S910.

Figure 16A:
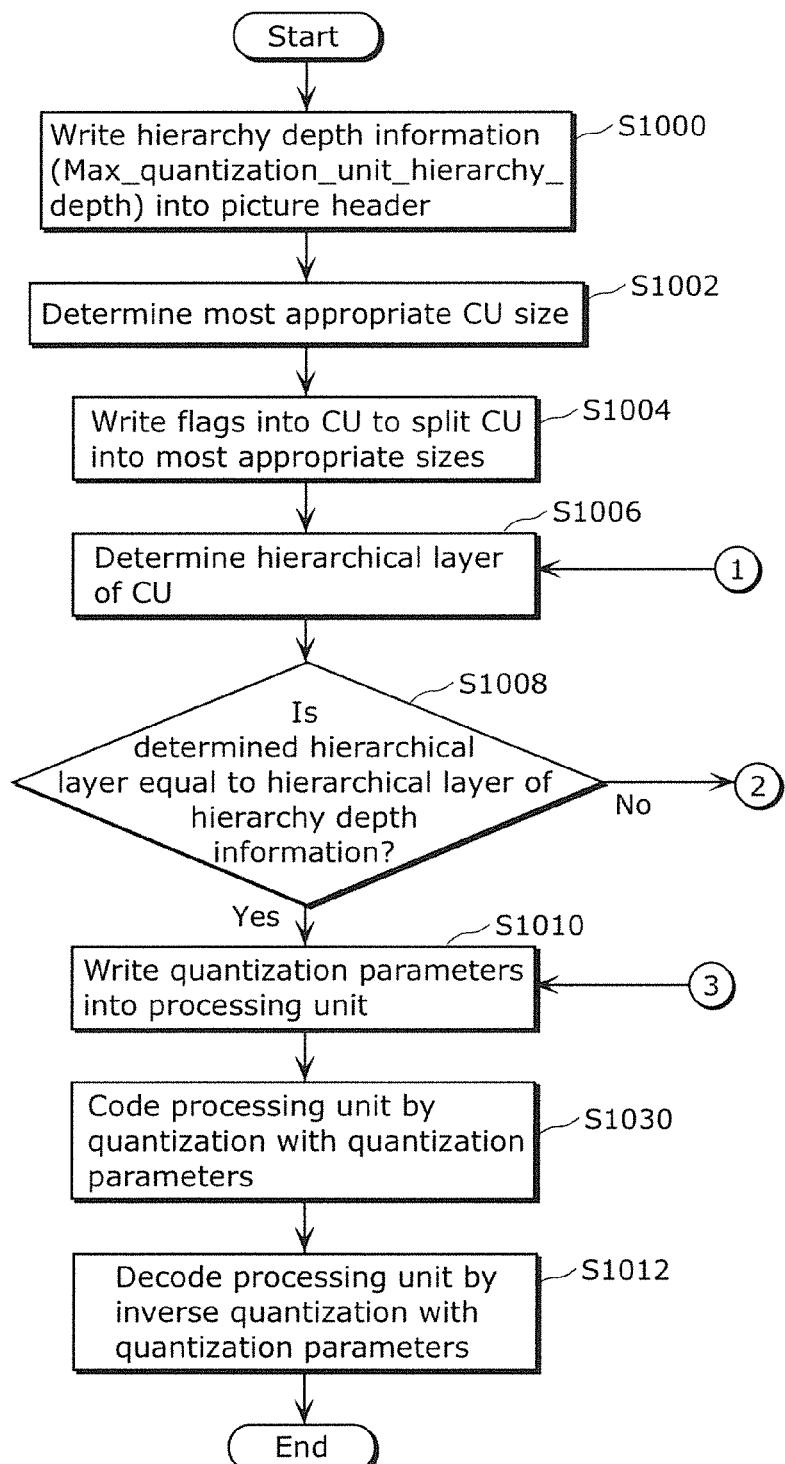
FIG. 16A is a flowchart showing coding by the image coding apparatus according to Modification 2 of Embodiment 1 of the present invention.
Figure 16B:
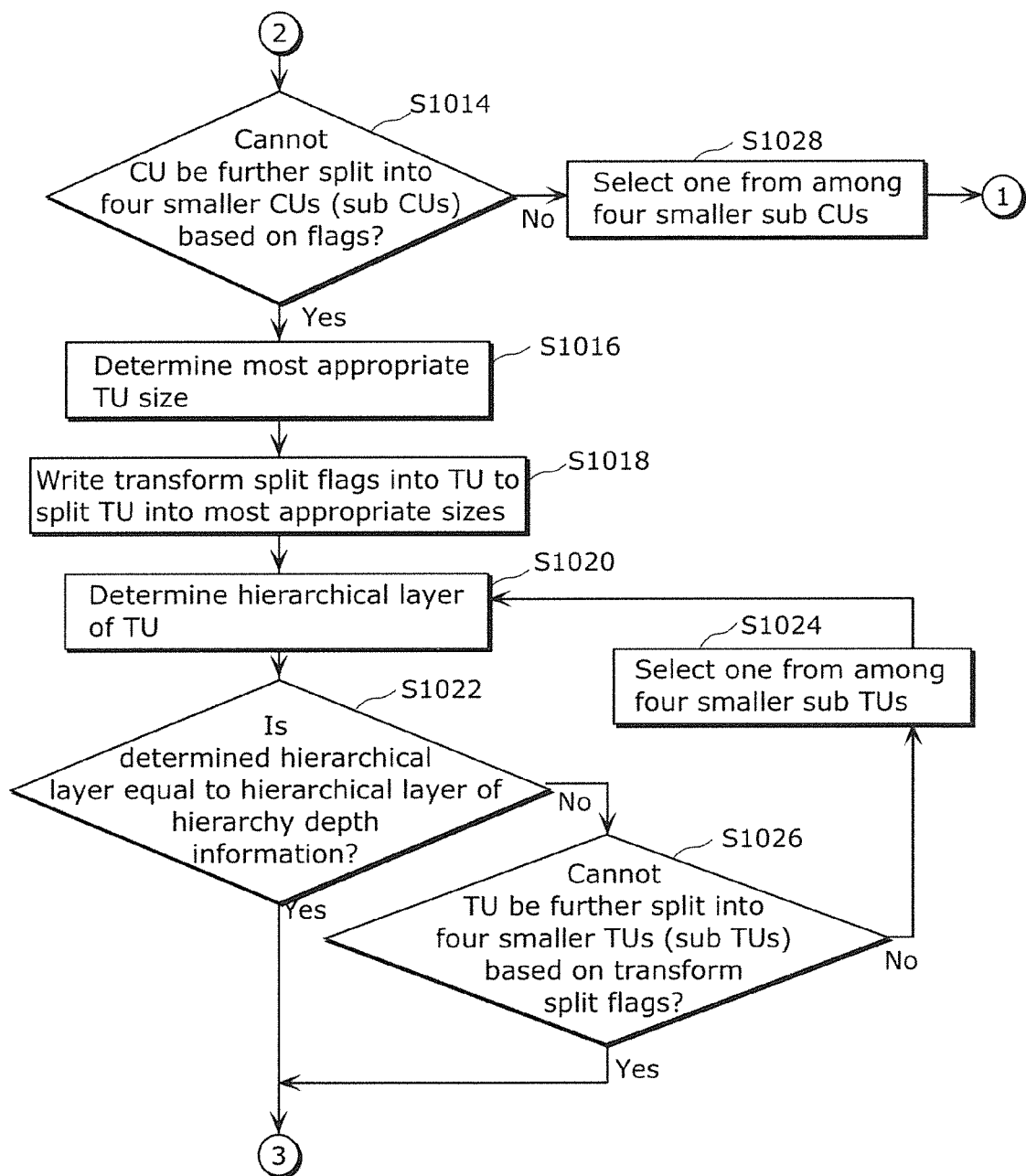
FIG. 16B is a flowchart showing coding by the image coding apparatus according to Modification 2 of Embodiment 1 of the present invention.

FIGS. 16A and 16B are each a flowchart of coding by an image coding apparatus 1000 according to Modification 2 of the present embodiment.

First, the image coding apparatus 1000 writes hierarchy depth information (Max_quantization_unit_hierarchy_depth) into the picture header (Step S1000), and determines the most appropriate size for splitting the CU (Step S1002). Next, the image coding apparatus 1000 writes, into the CU, flag for splitting the CU into processing units of the determined sizes (Step S1004). Then, the image coding apparatus 1000 determines the hierarchical layer of the processing unit to be coded (CU or sub CU) (Step S1006), and determines whether or not the determined hierarchical layer matches the hierarchical layer indicated by Max_quantization_unit_hierarchy_depth that is previously written (Step S1008).

When it is determined that they match with each other (Yes in Step S1008), the image coding apparatus 1000 writes quantization parameter into the processing unit (CU or sub CU) (Step S1010), the image coding apparatus 1000 codes the processing unit by performing quantization using the written quantization parameters (Step S1030). Furthermore, the image coding apparatus 1000 performs inverse quantization using the written quantization parameter to decode the coded processing unit (Step S1012).

Meanwhile, when it is determined in Step S1008 that they do not match with each other (No in Step S1008), the image coding apparatus 1000 determines whether the processing unit cannot be further split into four smaller sub CUs, based on the above described flag (Step S1014). When it is determined that the sub CU can be further split (No in Step S1014), the image coding apparatus 1000 selects any one of the four smaller sub CUs (Step S1028) and performs the processes from S1006 on the selected sub CU.

Meanwhile, when it is determined that the sub CU cannot be further split in Step S1014 (Yes in Step S1014), the image coding apparatus 1000 determines the most appropriate size for splitting the TU within the processing unit (CU or sub CU) (Step S1016), and writes, into the TU, flag (transform split flag) for splitting the TU into processing units of the determined sizes (Step S1018). Next, the image coding apparatus 1000 determines the hierarchical layer from LCU with respect to the processing unit to be coded (TU or sub TU) (Step S1020), and determines whether or not the determined hierarchical layer matches the hierarchical layer indicated by Max_quantization_unit_hierarchy_depth that is previously written (Step S1022).

When it is determined that they match with each other (Yes in Step S1022), the image coding apparatus 1000 performs the processes from Step S1010 on the processing unit (TU or sub TU) (Step S1010). Meanwhile, when it is determined in Step S1022 that they do not match with each other (No in Step S1022), the image coding apparatus 1000 determines whether the processing unit (TU or sub TU) cannot be further split into four smaller sub TUs, based on the above described transform split flag (Step S1026). When it is determined that the sub TU can be further split (No in Step S1026), the image coding apparatus 1000 selects any one of the four smaller sub TUs (Step S1024) and performs the processes from S1020 on the selected sub TU. When it is determined in Step S1026 that the sub TU cannot be further split (Yes in Step S1026), the image coding apparatus 1000 performs the processes from S1010. In other words, the image coding apparatus 1000 writes quantization parameter into the processing unit (TU or sub TU) (Step S1010), the image coding apparatus 1000 codes the processing unit by performing quantization using the written quantization parameters (Step S1030). Furthermore, the image coding apparatus 1000 performs inverse quantization using the written quantization parameter to decode the coded processing unit (Step S1012).

The problems and the solution in the present invention are as follows.

In other words, by splitting a picture into large coding units, coding efficiency can be improved. However, when the quantization parameter is set to a large coding unit, flexibility in adjusting the size of the picture is lost in the image coding apparatus since the size of the coding unit is large. The quantization parameter includes at least one of quantization scale parameter, quantization offset parameter, and index. It should be noted that the index is to select a quantization scale matrix from among a plurality of quantization scale matrixes.

For example, an important feature of coding and decoding of a moving picture is that video device requiring low delay in teleconference and security camera can adjust the maximum size of a picture. With this, it is necessary for the quantization parameter to be adjusted with the smallest unit of a picture. Meanwhile, the other video devices do not require the above described feature, and can improve coding efficiency by reducing an overhead for transmitting the quantization parameters.

Here, the coding unit, the prediction unit, and the transform unit are basic units of the High Efficiency Video Coding (HEVC) standard. QP that is a quantization scale parameter is a parameter used for inverse scaling process on a difference value (delta value), and is transmitted on a coding unit level. In Test Model Under Consideration (TMuC) of HEVC, the delta quantization scale parameter is not transmitted. However, in software, the delta quantization scale parameter is transmitted to the end of the quantization of the largest coding unit. However, when PU that is the prediction unit is skipped, the depth of the CU that is the coding unit is zero. This means that Y block, U block, and V block are not coded.

In other words, there are two problems (Problems 1 and 2) as follows.

Problem 1: the coding delta quantization scale parameter is restricted only on a largest coding unit level. It may be difficult for video device having low delay or constant bit rate to adjust a bit for each of the coding units. In other words, in TMuC standard and TMuC software, the restriction is strict on the storage position of information, and the quantization parameter can be transmitted only with the largest CU. As a result, it is not possible for the quantization parameter to be controlled by a smaller unit (processing unit).

Problem 2: when TU that is a transform unit is not coded, the quantization parameter is not necessary. However, the current technique checks when TU and PU are skipped. Since TU and PU are separated, the transmission of QP delta only depends on TU. Moreover, when there are no transform coefficients (coefficients generated by quantization and orthogonal transform of an image in a space region), it is necessary for an unnecessary quantization parameter with respect to the transform coefficients to be transmitted. As a result, a coded stream which shows a coded image becomes redundant.

In order to solve the above described problems, a new method is provided for transmitting quantization parameter for each maximum coding unit. The transmission method allows the image coding apparatus to select a level for a quantization parameter included in the coding unit to be transmitted in order to ensure both the functionality of fine bit control of a block and high coding efficiency.

What is novel about the present invention is high flexibility or functionality for the image coding device in which the location of the quantization parameter in the largest coding unit of a picture is determined for better control of data rate. The functionality is not present in any prior art and can help improve image quality of a coded moving picture by combining uses of the largest coding unit and the quantization parameter. What is also novel about the present invention is the location of the quantization parameter in the coding unit. Especially, in the conventional technique, the quantization parameter is included in the header of the coding unit such as macroblock. However, in the present invention, after the prediction and difference information on the block is coded, the quantization parameter is coded at the end of the coding unit.

In other words, there are solutions to the above described Problems 1 and 2 (Solution 1 and Solution 2) as follows.

Solution 1: In order to transmit delta QP at a small CU level, hierarchy depth information is inserted into header (sequence parameter set/picture parameter set/slice header). In other words, the image coding apparatus stores the quantization parameter in a small unit (processing unit) located deeper than the maximum CU, and stores, in a header such as sequence header or picture header, hierarchy depth information for specifying the hierarchical layer (depth of the hierarchical layer) in which the processing unit exists. The image decoding apparatus specifies the hierarchical layer by parsing the hierarchy depth information (depth of the hierarchical layer) in the header, and parses the quantization parameter stored in the processing unit located in the specified hierarchical layer. Here, the hierarchy depth information may indicate the deepest (lowest located) hierarchical layer in which the processing unit storing the quantization parameter can exist. In this case, the image decoding apparatus specifies the lowest hierarchical layer indicated by the hierarchy depth information or the hierarchical layer which is located higher than the hierarchical layer and is other than the highest hierarchical layer. Moreover, the hierarchy depth information may be a flag which shows whether or not the quantization parameter is stored in a CU of a predetermined hierarchical layer (for example, the CU which is located at the lowest hierarchical layer).

Solution 2: In order to skip the transmission of delta QP, a new condition is introduced for checking TU coded block flag or a pattern. Moreover, the image coding apparatus dispose the quantization parameter at the end of the TU when transmitting the quantization parameter. With this, the image decoding apparatus can determine when the quantization parameter is not necessary (when there are no transform coefficients). As a result, the image coding apparatus does not have to transmit unnecessary quantization parameters, and the amount of coding can be reduced.

As described above, the image decoding method and the image coding method according to the present invention have been described with reference to the above described embodiments and modifications. However, the present invention is not defined only by these.

For example, the processes such as Steps S3 and S5 in FIG. 11 are included in the image decoding method according to Embodiment 1 and its modification. However, the prevent invention can generate the above described effect without the processes.

Figure 17A:
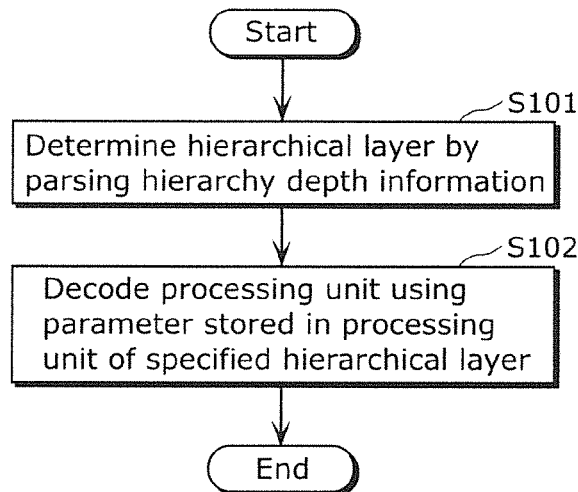
FIG. 17A is a flowchart showing an image decoding method according to the present invention.

FIG. 17A is a flowchart showing an image decoding method according to the present invention.

The image decoding method according to the present invention is an image decoding method for decoding a coded stream including a plurality of processing units and a header with respect to the processing units, the coded stream being generated by coding a moving picture. Here, at least one of the processing units is layered such that the processing unit is divided into a plurality of smaller processing units. In the image decoding method, first, by parsing hierarchy depth information stored in the header, a hierarchical layer is specified in which the processing unit storing a parameter necessary for decoding exists (Step S101). Next, by using the parameter stored in the processing unit located at the specified hierarchical layer, the processing unit is decoded (Step S102).

By performing the processes of Steps S101 and S102, it is possible to obtain the same effect as that obtained from Embodiment 1. The other processes are not essential for the present invention. Moreover, the image decoding apparatus according to the present invention can obtain the same effect as that obtained from Embodiment 1 by including a constituent element which performs each of the processes of Step S101 and Step S102. The other constituent elements are not essential for the present invention. It should be noted that in the image decoding apparatus 2000 according to Embodiment 1, the decoding control unit 2200 performs the process of Step S101 and the decoding processing unit 2100 performs the process of Step S102.

Moreover, the processes such as Step S804 in FIG. 14 are included in the image coding method according to Embodiment 1 and its modification. However, the prevent invention can generate the above described effect without the processes.

Figure 17B:
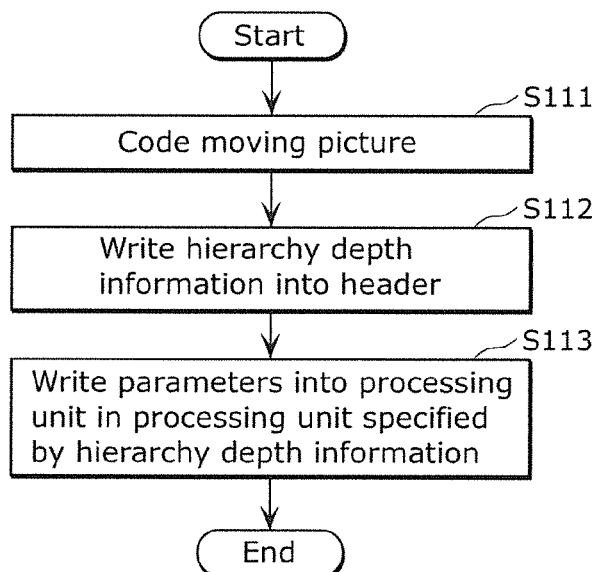
FIG. 17B is a flowchart showing an image coding method according to the present invention.

FIG. 17B is a flowchart showing an image coding method according to the present invention.

The image decoding method according to the present invention is an image decoding method for generating, by coding a moving picture, a coded stream including a plurality of processing units and a header with respect to the processing units. Here, at least one of the processing units is layered such that the processing unit is split into a plurality of smaller processing units. In the image coding method, a moving picture is first coded (Step S111). Next, hierarchy depth information for specifying the hierarchical layer having a processing unit in which a parameter necessary for decoding is stored is written into the header (Step S112). Furthermore, the parameter is written into the processing unit located in the hierarchical layer specified by the hierarchy depth information (Step S113).

By performing the processes of Steps S111 and S113, it is possible to obtain the same effect as that obtained from Embodiment 1. The other processes are not requisite for the present invention. Moreover, the image decoding apparatus according to the present invention can obtain the same effect as that obtained from Embodiment 1 by including a processing unit which performs each of the processes of Step S111 to Step S113. The other constituent elements are not essential for the present invention. It should be noted that in the image coding apparatus 1000 according to Embodiment 1, the entropy coding unit 1104 performs the processes of Steps S111 to S113, based on the control by the coding control unit 1200.

Figure 18B:
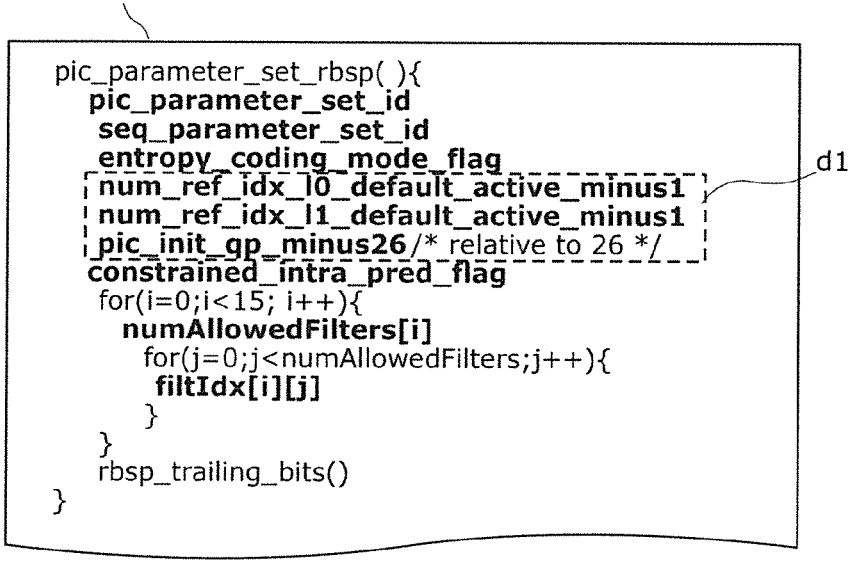
FIG. 18B is a diagram showing a syntax of picture header according to Embodiment 1 of the present invention.
Figure 19A:
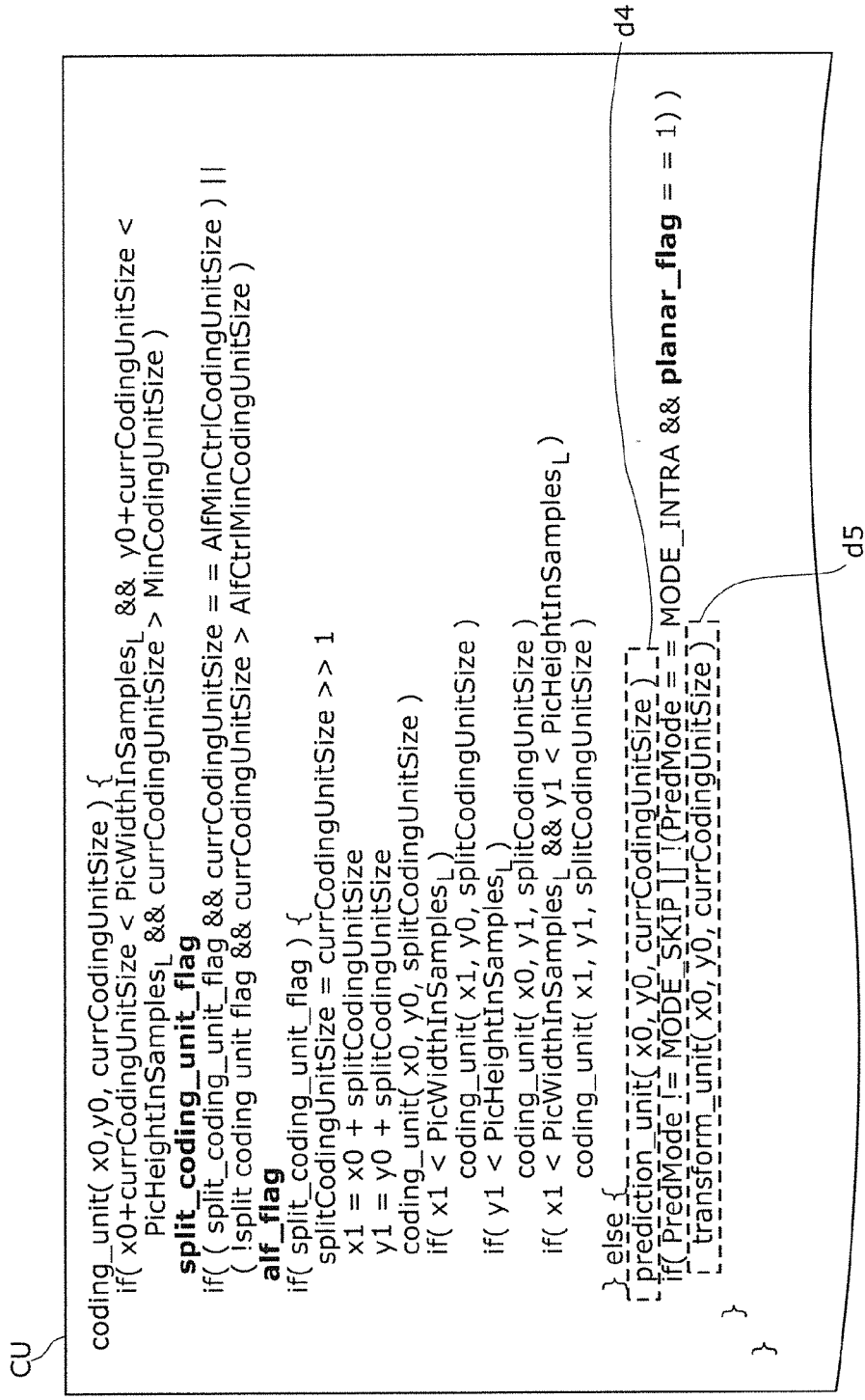
FIG. 19A is a diagram showing a syntax of coding unit (CU) according to Embodiment 1 of the present invention.

It should be noted a syntax of the header related to the present invention are shown in FIGS. 18A to 18C. The syntaxes of the processing units related to the present invention (CU, PU, and TU) are shown in FIGS. 19A to 19C.

FIG. 18A is a diagram showing the syntax of the sequence header. In the sequence header, for example, the number of maximum reference frames that can be referred (max_num_ref_frames) and the size of the picture (pic_width_in_luma_samples, pic_height_in_luma_samples) are defined.

FIG. 18B is a diagram showing the syntax of the picture header. In the picture header, as shown in part d1 of the syntax, the number of reference indexes to be held for each reference direction (forward direction and backward direction) is defined, and an initial QP (number obtained by subtracting 26 from the initial QP) is defined.

FIG. 18C is a diagram showing the syntax of the slice header. The slice header, as shown in part d2 of the syntax, is configured such that the number of the above described reference indexes to be held can be rewritten for each slice. Moreover, the slice header, as shown in another part d3 of the syntax, defines the difference value of QP from the initial QP which is defined by the above described picture header.

FIG. 19A is a diagram showing the syntax of CU. In the CU, as shown in parts d4 and d5 of the syntax, PU and TU with respect to the CU are defined.

FIG. 19B is a diagram showing the syntax of PU. The PU has, as shown in parts d6 and d8 of the syntax, a reference index for each reference direction, and has, as shown in other parts d7 and d9 of the syntax, adaptive motion vector resolution switch flag (mvres) for each reference direction.

FIG. 19C is a diagram showing the syntax of TU. The TU has, as shown in part d10 of the syntax, coefficients (transform coefficients) in which orthogonal transform and quantization are performed on the difference image.

Embodiment 2

The processing described in each of embodiments can be simply implemented in an independent computer system, by recording, in a recording medium, a program for implementing the configurations of the moving picture coding method (image coding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture coding method (image coding method) and the moving picture decoding method (image decoding method) described in each of embodiments and systems using thereof will be described.

FIG. 20 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 20, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of embodiments (i.e., the camera functions as the image coding apparatus according to an aspect of the present invention), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (i.e., functions as the image decoding apparatus according to an aspect of the present invention).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 21:
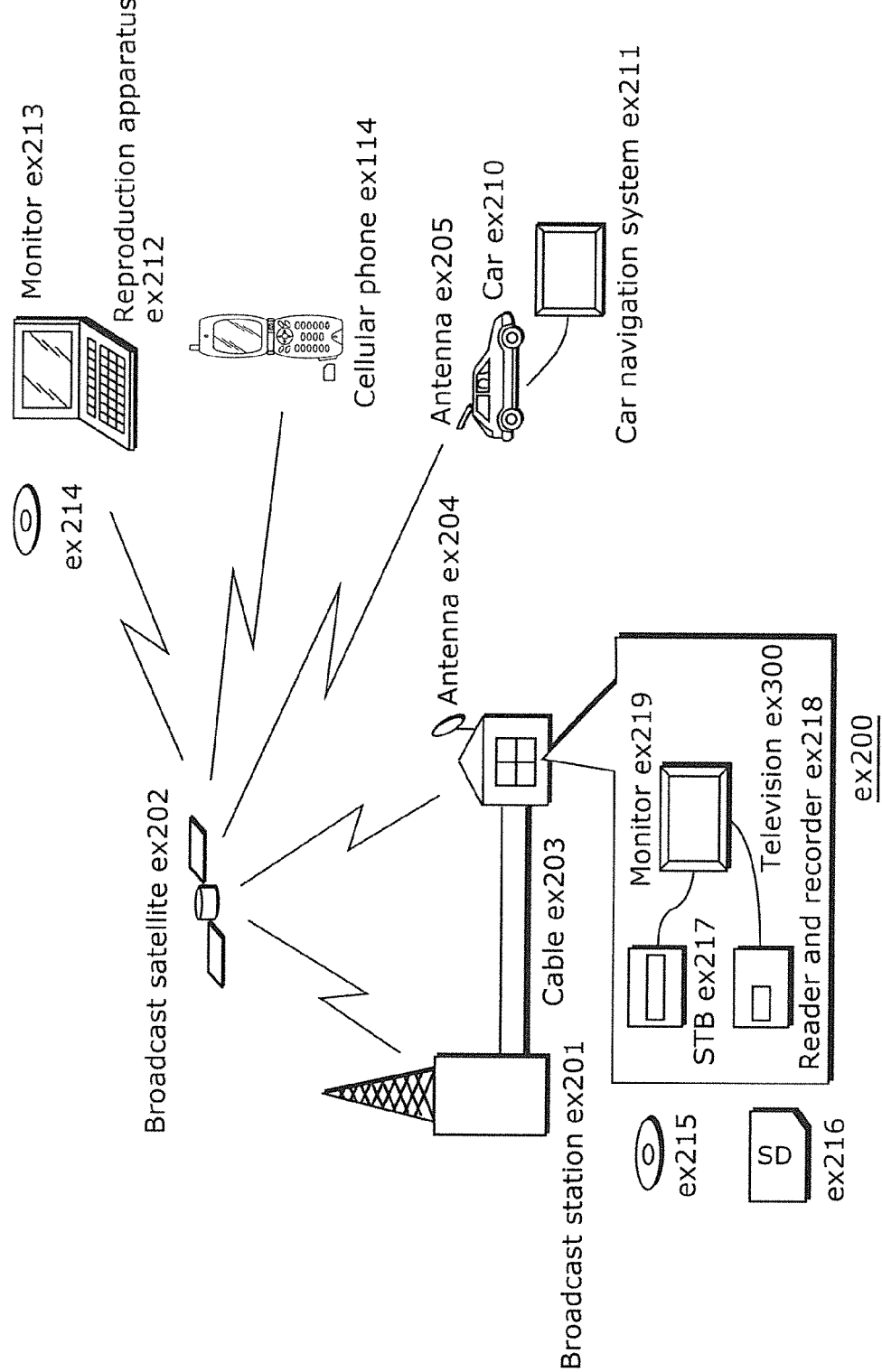
FIG. 21 shows an overall configuration of a digital broadcasting system.

Aside from the example of the content providing system ex100, at least one of the moving picture coding apparatus (image coding apparatus) and the moving picture decoding apparatus (image decoding apparatus) described in each of embodiments may be implemented in a digital broadcasting system ex200 illustrated in FIG. 21. More specifically, a broadcast station ex201 communicates or transmits, via radio waves to a broadcast satellite ex202, multiplexed data obtained by multiplexing audio data and others onto video data. The video data is data coded by the moving picture coding method described in each of embodiments (i.e., data coded by the image coding apparatus according to an aspect of the present invention). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present invention).

Furthermore, a reader/recorder ex218 (i) reads and decodes the multiplexed data recorded on a recording medium ex215, such as a DVD and a BD, or (i) codes video signals in the recording medium ex215, and in some cases, writes data obtained by multiplexing an audio signal on the coded data. The reader/recorder ex218 can include the moving picture decoding apparatus or the moving picture coding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 22:
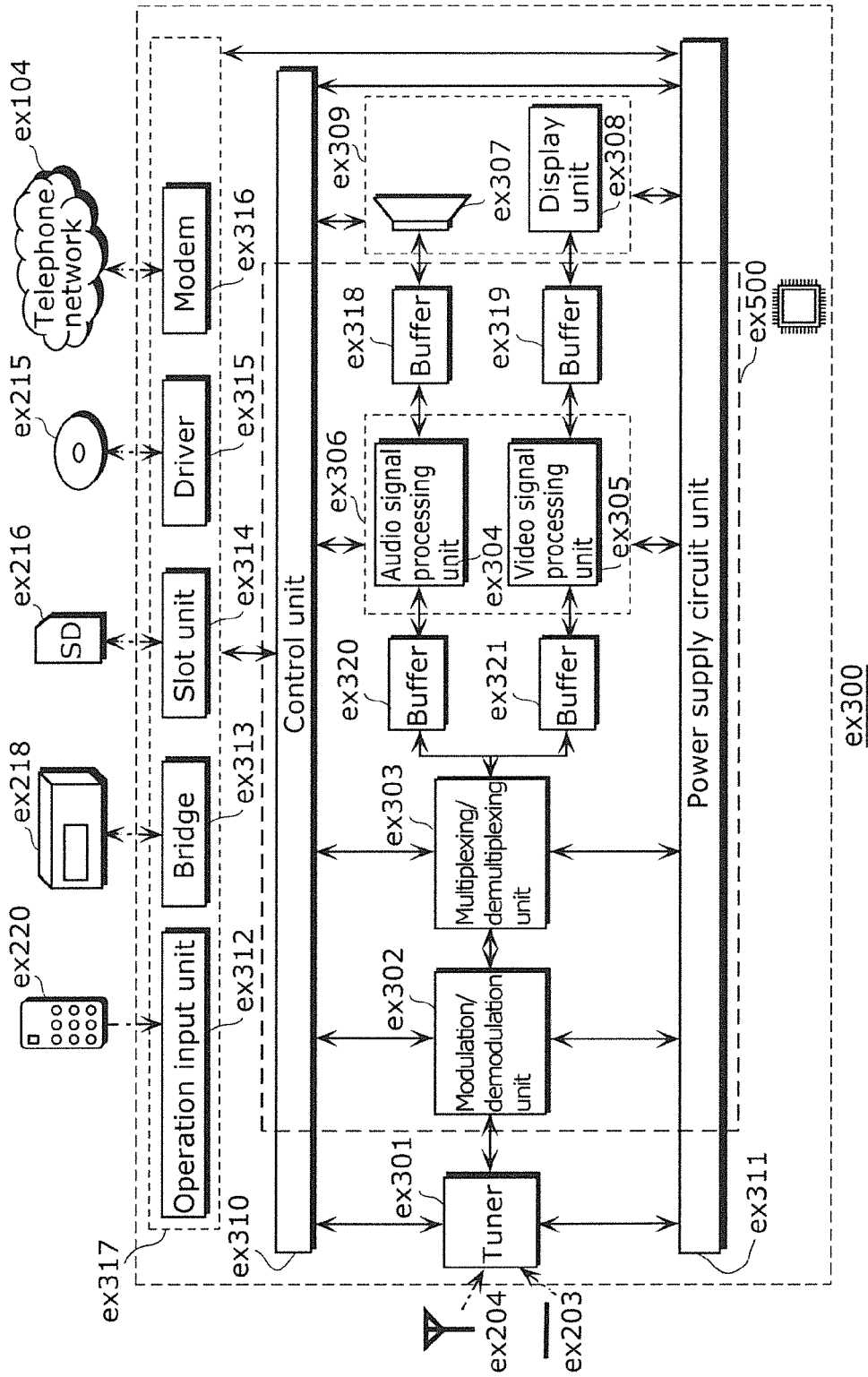
FIG. 22 shows a block diagram illustrating an example of a configuration of a television.

FIG. 22 illustrates the television (receiver) ex300 that uses the moving picture coding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively (which function as the image coding apparatus and the image decoding apparatus according to the aspects of the present invention); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 23:
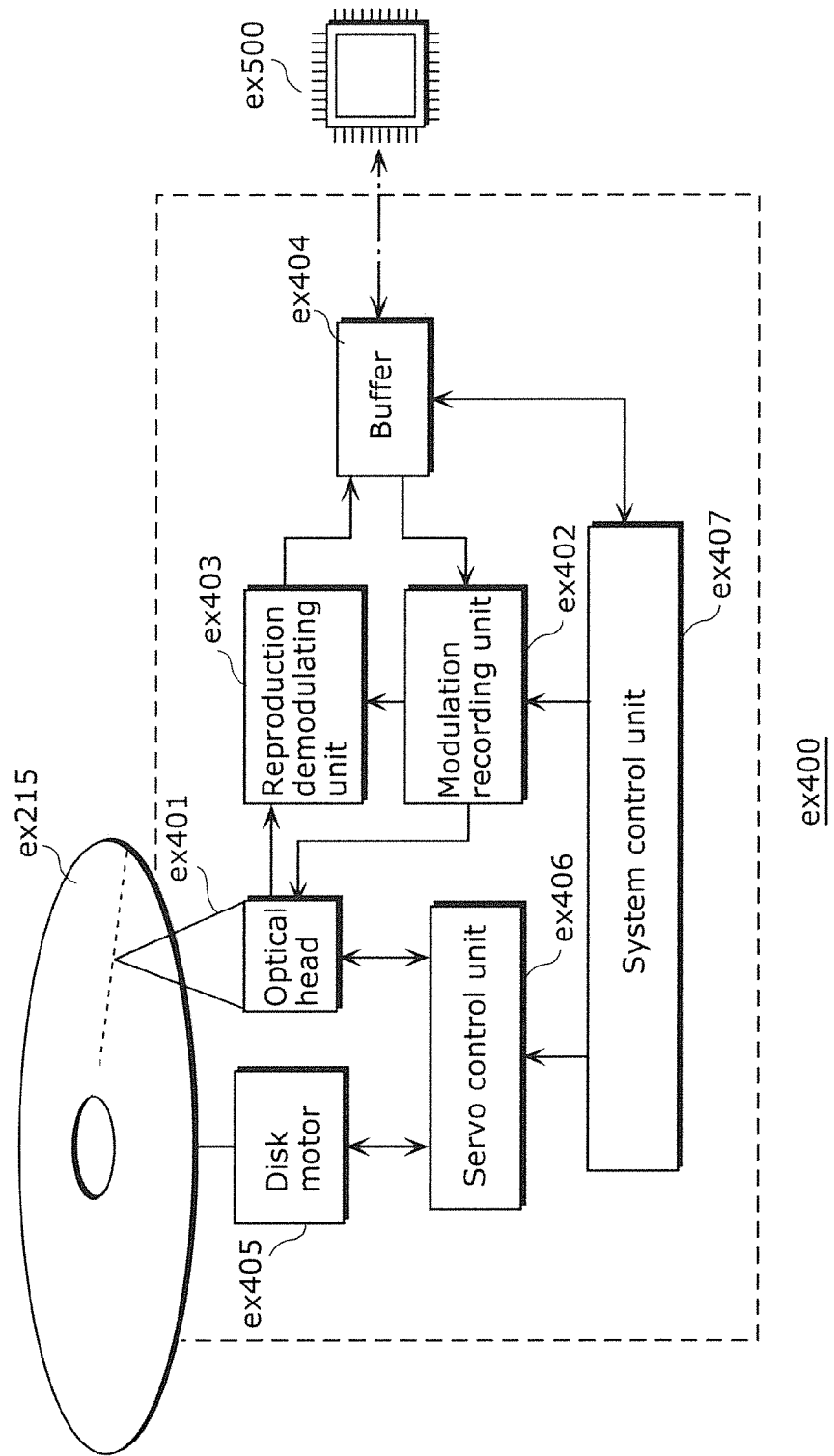
FIG. 23 shows a block diagram illustrating an example of a configuration of an information reproducing/recording unit that reads and writes information from and on a recording medium that is an optical disk.

As an example, FIG. 23 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 24:
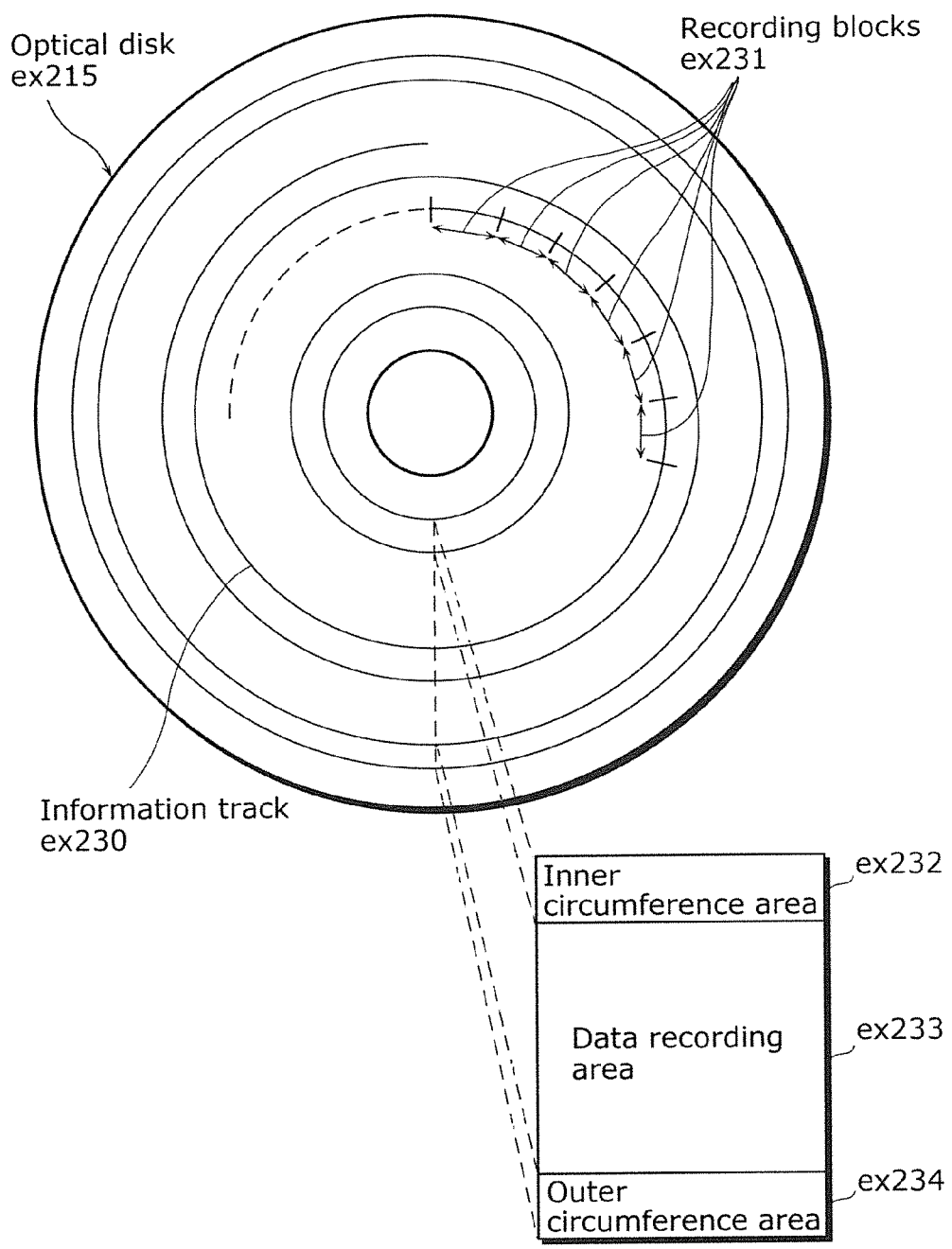
FIG. 24 shows an example of a configuration of a recording medium that is an optical disk.

FIG. 24 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 22. The same will be true for the configuration of the computer ex111, the cellular phone ex114, and others.

Figure 25A:
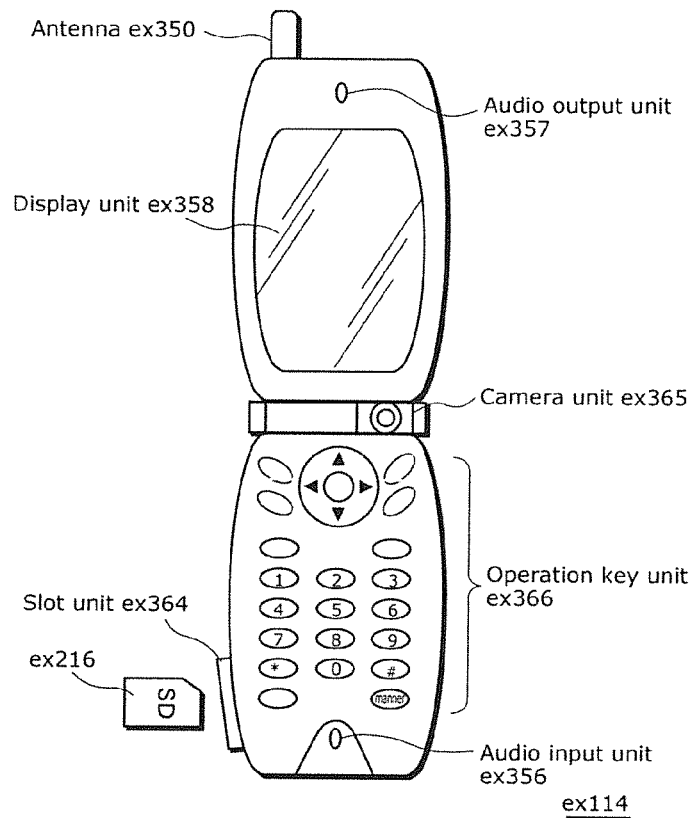
FIG. 25A shows an example of a cellular phone.

FIG. 25A illustrates the cellular phone ex114 that uses the moving picture coding method and the moving picture decoding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Figure 25B:
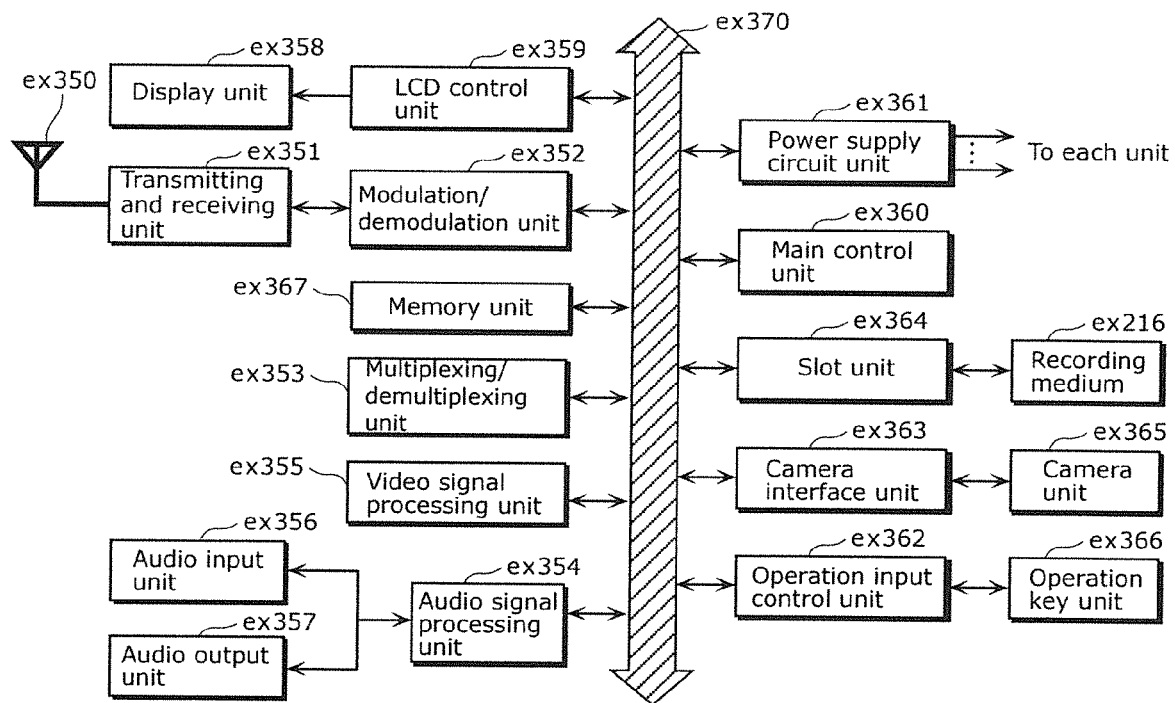
FIG. 25B is a block diagram showing an example of a configuration of a cellular phone.

Next, an example of a configuration of the cellular phone ex114 will be described with reference to FIG. 25B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of embodiments (i.e., functions as the image coding apparatus according to the aspect of the present invention), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of embodiments (i.e., functions as the image decoding apparatus according to the aspect of the present invention), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of embodiments can be used in any of the devices and systems described. Thus, the advantages described in each of embodiments can be obtained.

Furthermore, the present invention is not limited to embodiments, and various modifications and revisions are possible without departing from the scope of the present invention.

Embodiment 3

Video data can be generated by switching, as necessary, between (i) the moving picture coding method or the moving picture coding apparatus shown in each of embodiments and (ii) a moving picture coding method or a moving picture coding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conform cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of embodiments will be hereinafter described. The multiplexed data is a digital stream in the MPEG-2 Transport Stream format.

FIG. 26 illustrates a structure of the multiplexed data As illustrated in FIG. 26, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of embodiments, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 27:
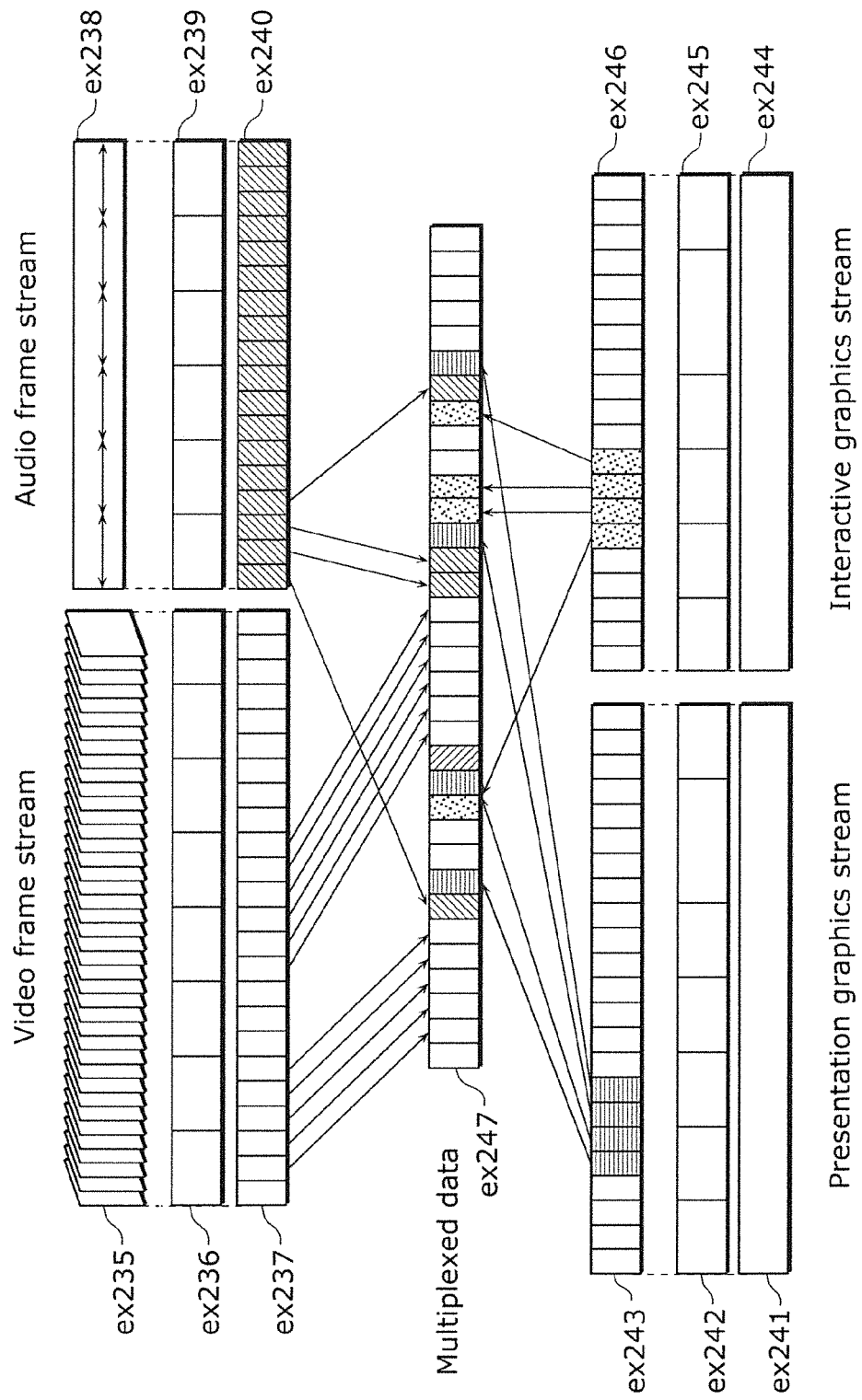
FIG. 27 schematically shows how each stream is multiplexed in multiplexed data.

FIG. 27 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 28:
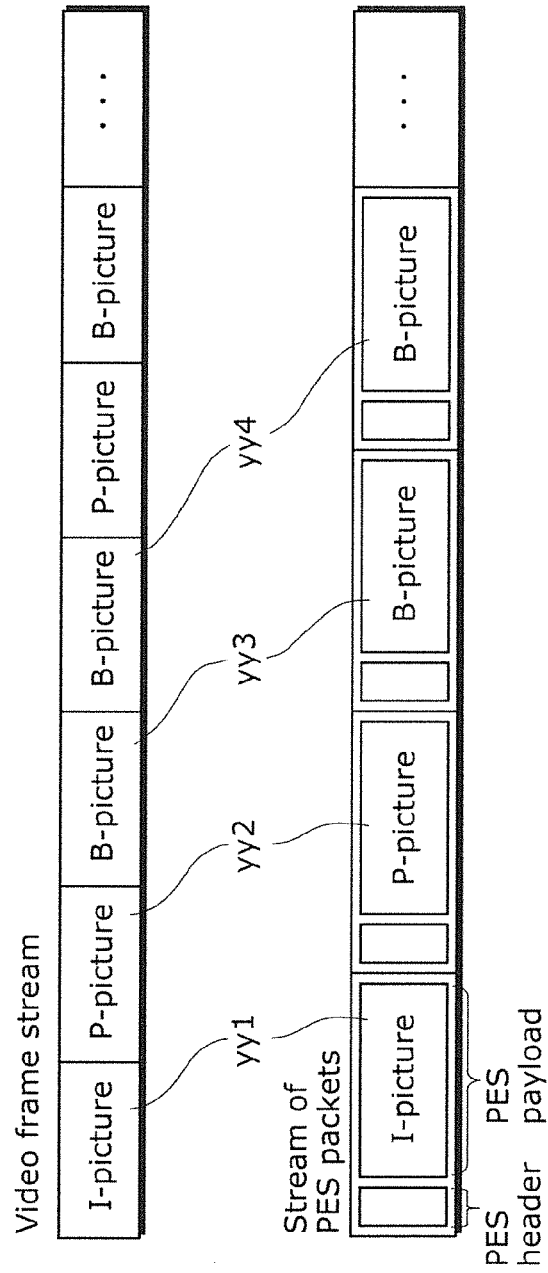
FIG. 28 shows how a video stream is stored in a stream of PES packets in more detail.

FIG. 28 illustrates how a video stream is stored in a stream of PES packets in more detail. The first bar in FIG. 28 shows a video frame stream in a video stream. The second bar shows the stream of PES packets. As indicated by arrows denoted as yy1, yy2, yy3, and yy4 in FIG. 28, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

Figure 29:
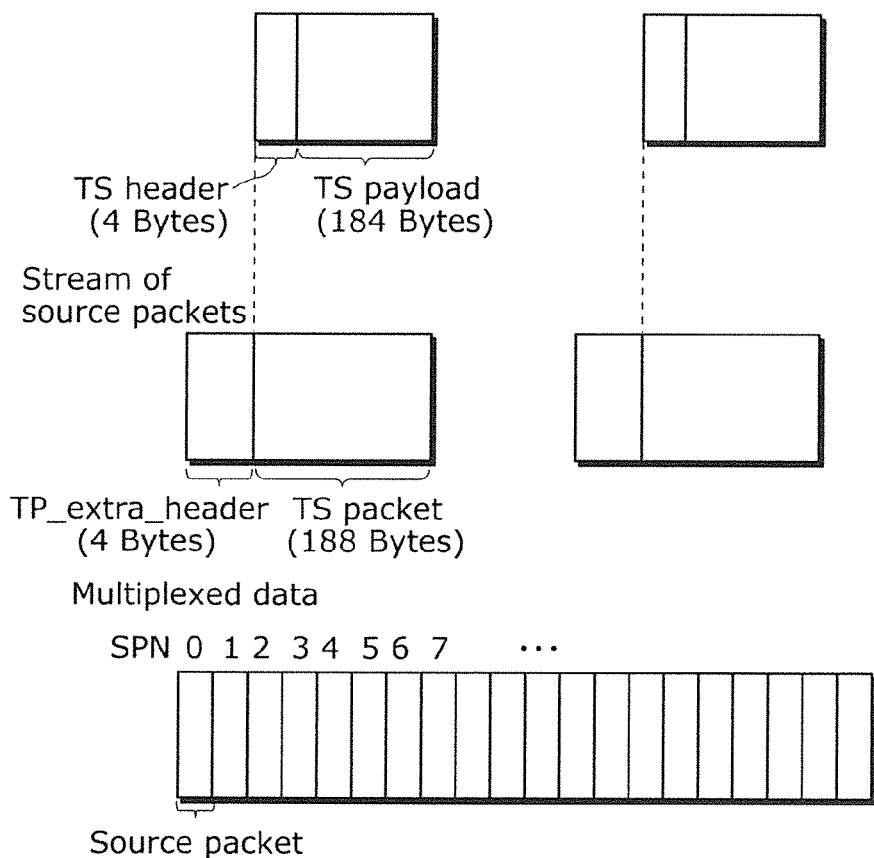
FIG. 29 shows a structure of TS packets and source packets in the multiplexed data.

FIG. 29 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 29. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not.

The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 30:
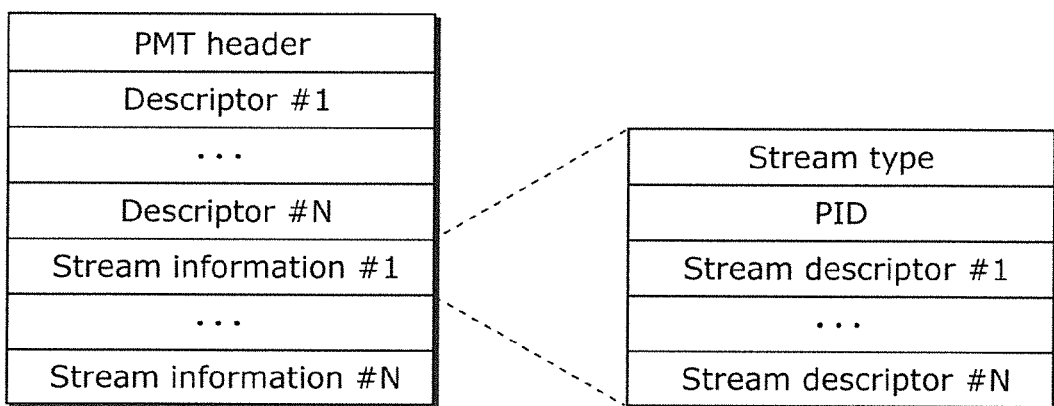
FIG. 30 shows a data structure of a PMT.

FIG. 30 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 31:
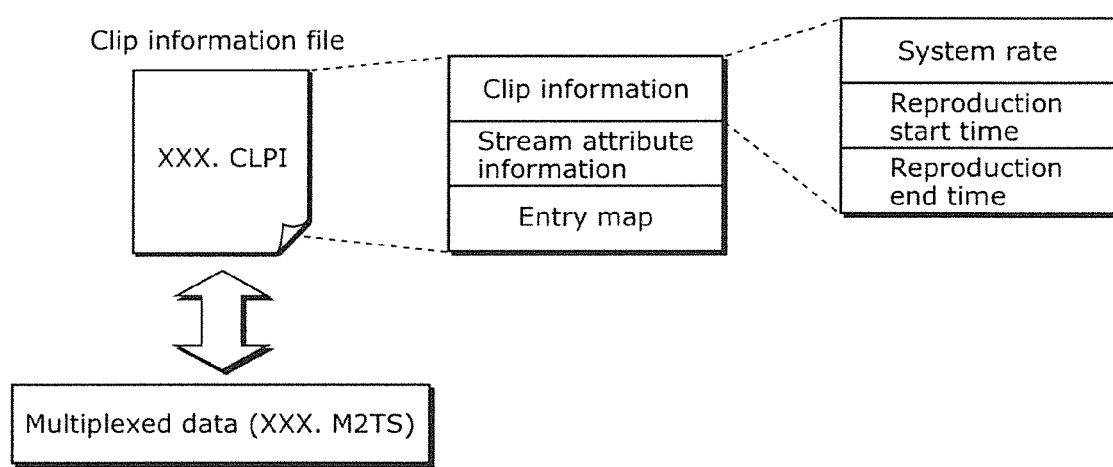
FIG. 31 shows an internal structure of multiplexed data information.

Each of the multiplexed data information files is management information of the multiplexed data as shown in FIG. 31. The multiplexed data information files are in one to one correspondence with the multiplexed data, and each of the files includes multiplexed data information, stream attribute information, and an entry map.

As illustrated in FIG. 31, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 32:
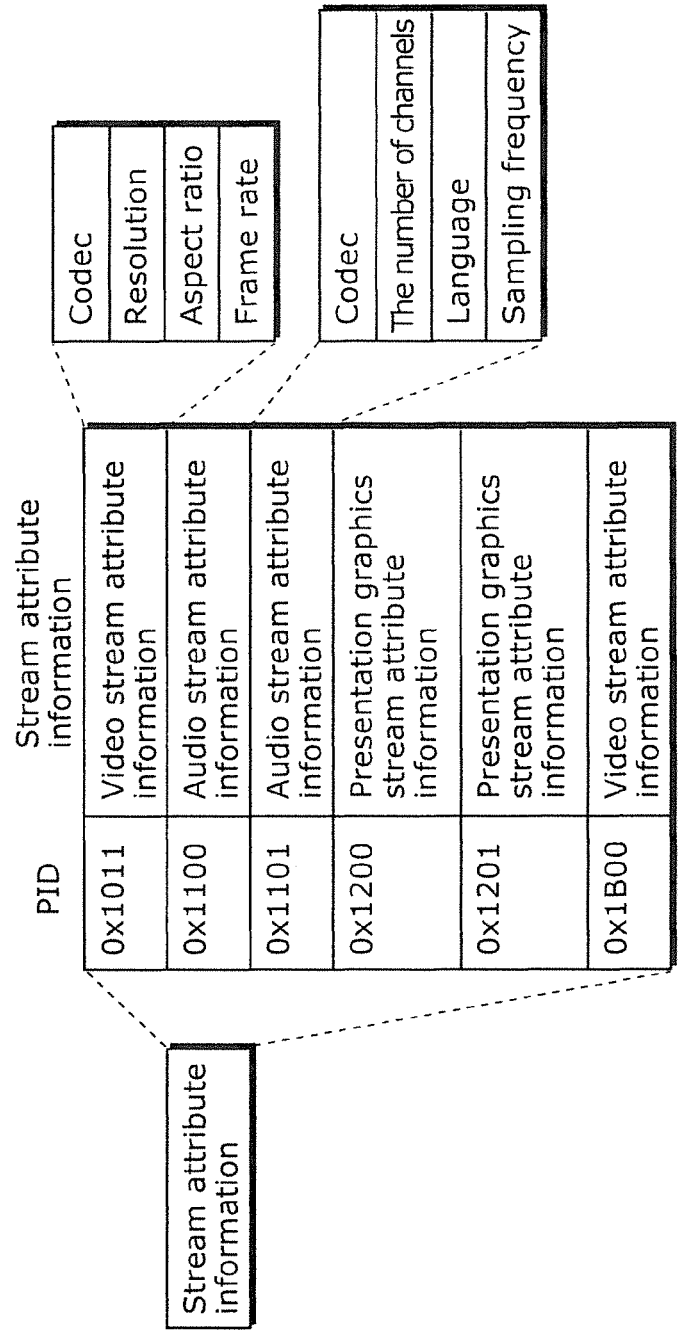
FIG. 32 shows an internal structure of stream attribute information.

As shown in FIG. 32, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of embodiments includes a step or a unit for allocating unique information indicating video data generated by the moving picture coding method or the moving picture coding apparatus in each of embodiments, to the stream type included in the PMT or the video stream attribute information. With the configuration, the video data generated by the moving picture coding method or the moving picture coding apparatus described in each of embodiments can be distinguished from video data that conforms to another standard.

Figure 33:
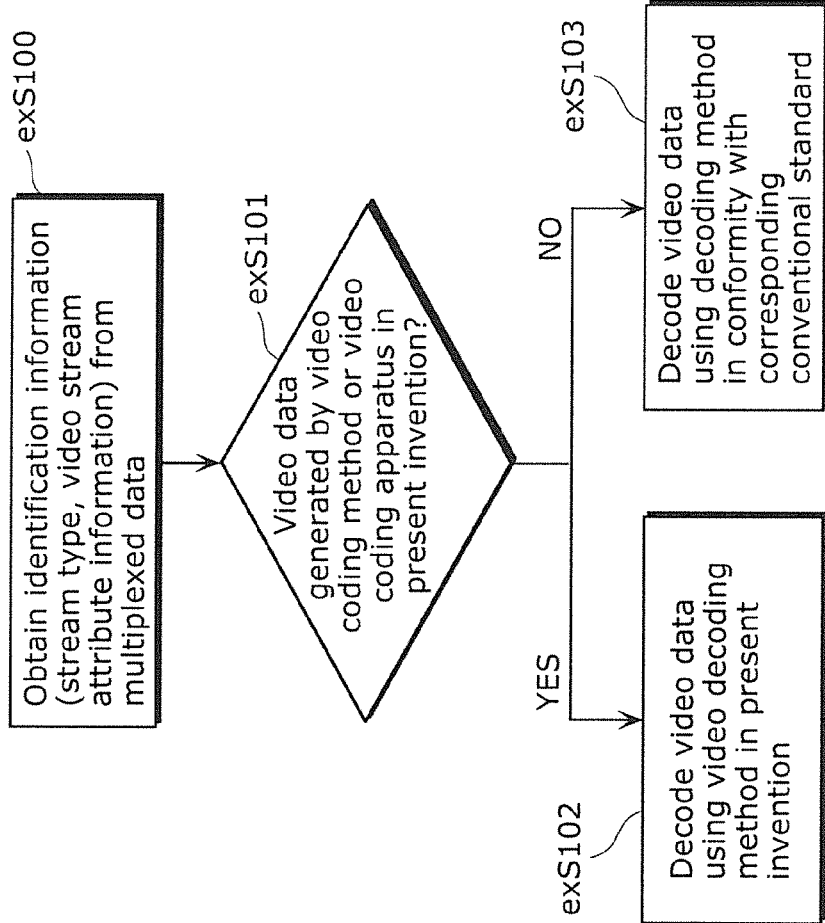
FIG. 33 shows steps for identifying video data.

Furthermore, FIG. 33 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture coding method or the moving picture coding apparatus in each of embodiments. When it is determined that the stream type or the video stream attribute information indicates that the multiplexed data is generated by the moving picture coding method or the moving picture coding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture coding method or apparatus, or the moving picture decoding method or apparatus in the present embodiment can be used in the devices and systems described above.

Embodiment 4

Figure 34:
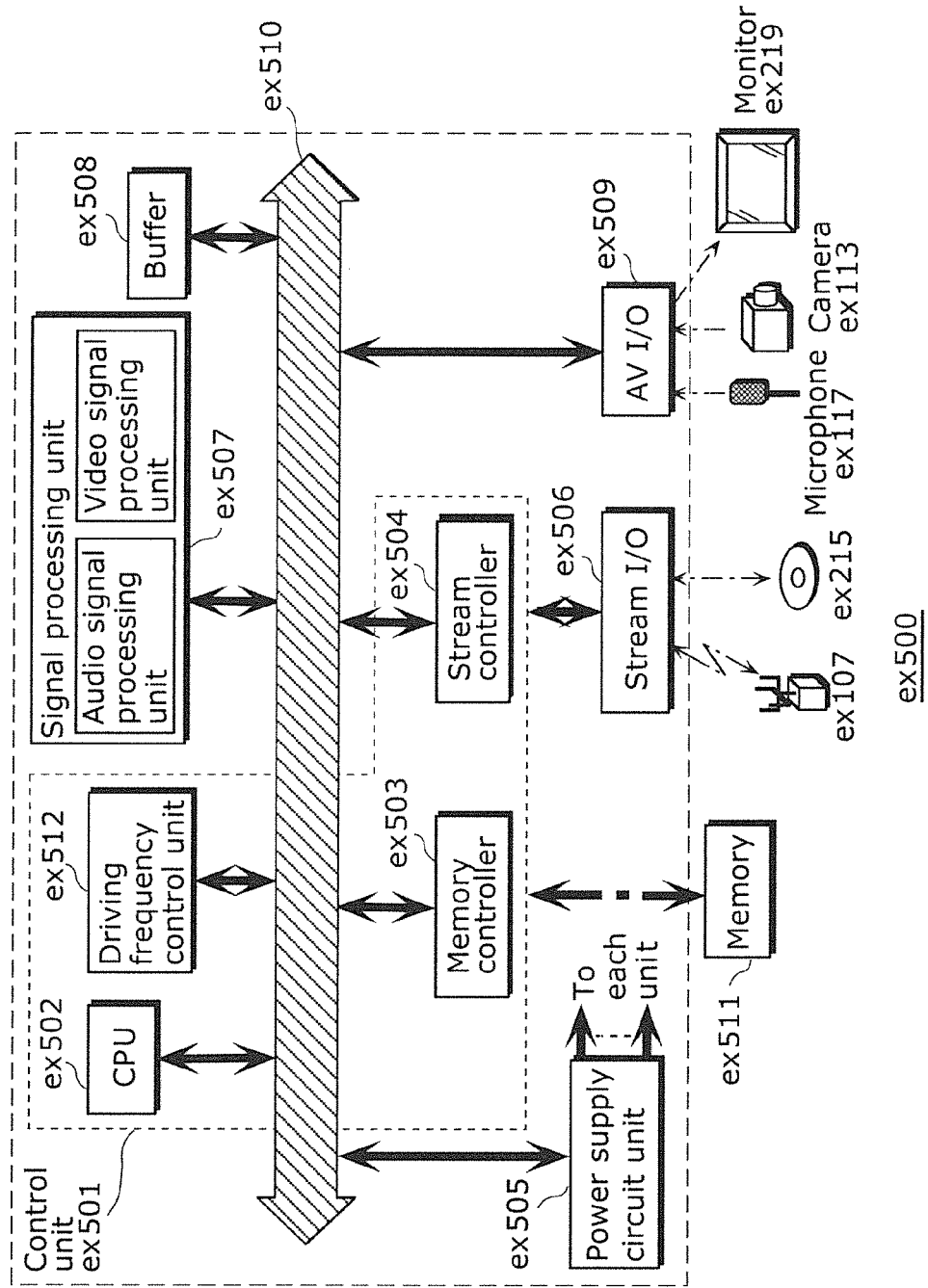
FIG. 34 shows an example of a configuration of an integrated circuit for implementing the moving picture coding method and the moving picture decoding method according to each of embodiments.

Each of the moving picture coding method, the moving picture coding apparatus, the moving picture decoding method, and the moving picture decoding apparatus in each of embodiments is typically achieved in the form of an integrated circuit or a Large Scale Integrated (LSI) circuit. As an example of the LSI, FIG. 34 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present invention is applied to biotechnology.

Embodiment 5

When video data generated in the moving picture coding method or by the moving picture coding apparatus described in each of embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 35:
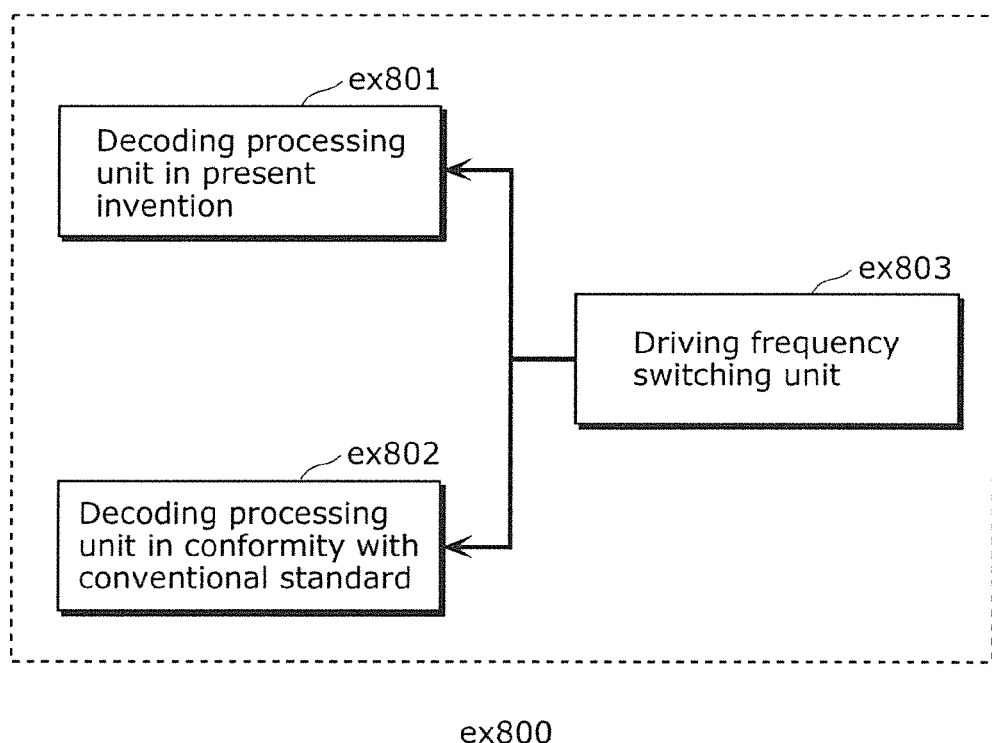
FIG. 35 shows a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 35 illustrates a configuration ex800 in the present embodiment. A driving frequency switching unit ex803 sets a driving frequency to a higher driving frequency when video data is generated by the moving picture coding method or the moving picture coding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 34. Here, each of the decoding processing unit ex801 that executes the moving picture decoding method described in each of embodiments and the decoding processing unit ex802 that conforms to the conventional standard corresponds to the signal processing unit ex507 in FIG. 34. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment 3 is probably used for identifying the video data. The identification information is not limited to the one described in Embodiment 3 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 37. The driving frequency can be selected by storing the look-up table in the buffer ex508 and in an internal memory of an LSI, and with reference to the look-up table by the CPU ex502.

Figure 36:
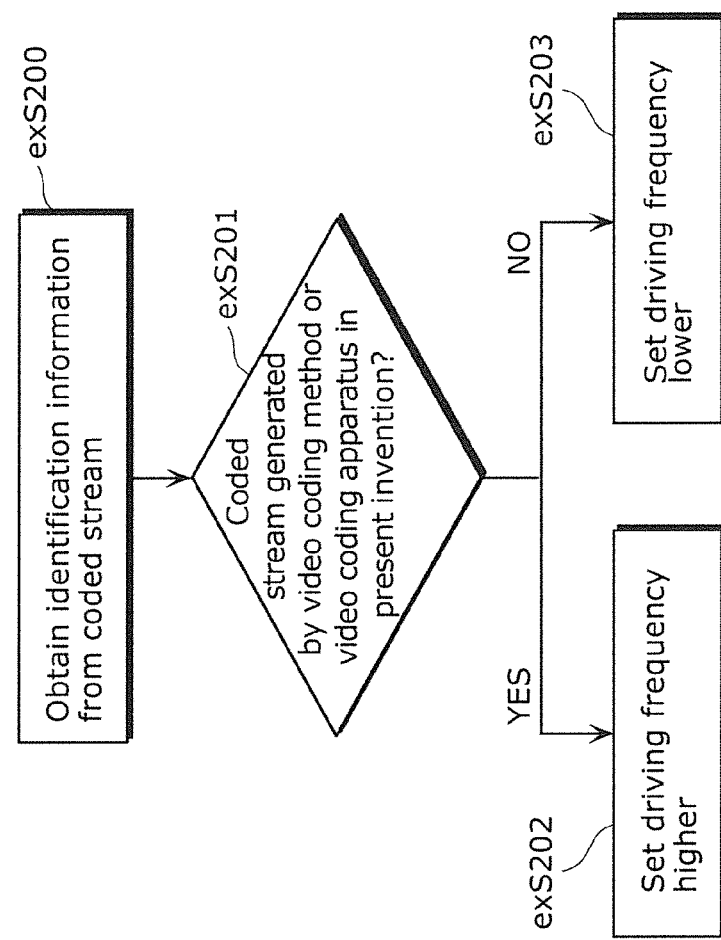
FIG. 36 shows steps for identifying video data and switching between driving frequencies.

FIG. 36 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of embodiments, based on the identification information. When the video data is generated by the moving picture coding method and the moving picture coding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture coding method and the moving picture coding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture coding method and the moving picture coding apparatus described in each of embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture coding method and the moving picture coding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 6

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 38A shows an example of the configuration. For example, the moving picture decoding method described in each of embodiments and the moving picture decoding method that conforms to MPEG-4 AVC have, partly in common, the details of processing, such as entropy coding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing unique to an aspect of the present invention. The decoding processing unit for implementing the moving picture decoding method described in each of embodiments may be shared for the processing to be shared, and a dedicated decoding processing unit may be used for processing unique to that of MPEG-4 AVC.

Furthermore, ex1000 in FIG. 38B shows another example in that processing is partly shared. This example uses a configuration including a dedicated decoding processing unit ex1001 that supports the processing unique to an aspect of the present invention, a dedicated decoding processing unit ex1002 that supports the processing unique to another conventional standard, and a decoding processing unit ex1003 that supports processing to be shared between the moving picture decoding method according to the aspect of the present invention and the conventional moving picture decoding method. Here, the dedicated decoding processing units ex1001 and ex1002 are not necessarily specialized for the processing according to the aspect of the present invention and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present invention and the moving picture decoding method in conformity with the conventional standard.

INDUSTRIAL APPLICABILITY

The image decoding method and the image coding method according to the present invention obtain an effect of improving both image quality and coding efficiency, and can be applied to a video camera, a mobile phone having functions of capturing moving pictures and reproducing moving pictures, a personal computer, or a recording and reproducing apparatus.

REFERENCE SIGNS LIST

1000 Image coding apparatus
1100 Coding processing unit
1101 Subtractor
1102 Orthogonal transform unit
1103 Quantization unit
1104 Entropy coding unit
1105 Inverse quantization unit
1106 Inverse orthogonal transform unit
1107 Adder
1108 Deblocking filter
1109 Memory
1110 Intra prediction unit
1111 Motion compensation unit
1112 Motion estimation unit
1113 Switch
1200 Coding control unit
2000 Image decoding apparatus
2100 Coding processing unit
2101 Entropy decoding unit
2102 Inverse quantization unit
2103 Inverse orthogonal transform unit
2104 Adder
2105 Deblocking filter
2106 Memory
2107 Intra prediction unit
2108 Motion compensation unit
2109 Switch
2200 Decoding control unit

The invention claimed is:
1. A decoding method comprising:
   determining, using first information in a picture header of a picture and second information provided for a first block, whether or not a first quantization parameter to be used for decoding the first block is provided for a unit, the picture including the unit, the unit including the first block; and decoding the first block, wherein, when the first quantization parameter is determined to be provided, (i) the decoding includes deriving a value for dequantization by using the first quantization parameter and (ii) the first quantization parameter is used for other blocks included in the unit, and wherein, when the first quantization parameter is determined not to be provided, the decoding includes deriving a value for dequantization by not using the first quantization parameter and by using a second quantization parameter which is provided for the first block.

2. A decoding apparatus comprising:

a processor; and a non-transitory memory having stored thereon executable instructions, which when executed, cause the processor to perform:

determining, using first information in a picture header of a picture and second information provided for a first block, whether or not a first quantization parameter to be used for decoding the first block is provided for a unit, the picture including the unit, the unit including the first block; and decoding the first block, wherein, when the first quantization parameter is determined to be provided, (i) the decoding includes deriving a value for dequantization by using the first quantization parameter and (ii) the first quantization parameter is used for other blocks included in the unit, and wherein, when the first quantization parameter is determined not to be provided, the decoding includes deriving a value for dequantization by not using the first quantization parameter and by using a second quantization parameter which is provided for the first block.

3. A coding method comprising:

determining, using first information in a picture header of a picture and second information provided for a first block, whether or not a first quantization parameter to be used for coding the first block is provided for a unit, the picture including the unit, the unit including the first block; and coding the first block, wherein, when the first quantization parameter is determined to be provided, (i) the coding includes deriving a value for dequantization by using the first quantization parameter and (ii) the first quantization parameter is used for other blocks included in the unit, and wherein, when the first quantization parameter is determined not to be provided, the coding includes deriving a value for dequantization by not using the first quantization parameter and by using a second quantization parameter which is provided for the first block.

4. A coding apparatus comprising:

a processor; and a non-transitory memory having stored thereon executable instructions, which when executed, cause the processor to perform:

determining, using first information in a picture header of a picture and second information provided for a first block, whether or not a first quantization parameter to be used for coding the first block is provided for a unit, the picture including the unit, the unit including the first block; and coding the first block, wherein, when the first quantization parameter is determined to be provided, (i) the coding includes deriving a value for dequantization by using the first quantization parameter and (ii) the first quantization parameter is used for other blocks included in the unit, and wherein, when the first quantization parameter is determined not to be provided, the coding includes deriving a value for dequantization by not using the first quantization parameter and by using a second quantization parameter which is provided for the first block.

* * * * *